US006619904B1

(12) United States Patent
Barry

(10) Patent No.: US 6,619,904 B1
(45) Date of Patent: Sep. 16, 2003

(54) CONTAINER TRANSFER CROSSOVER AND SYSTEM

(76) Inventor: Leonard Dodge Barry, 19300 Pennington, Detroit, MI (US) 48221

( * ) Notice: Subject to any disclaimer, the term of this patent is extended or adjusted under 35 U.S.C. 154(b) by 0 days.

(21) Appl. No.: 09/623,621

(22) PCT Filed: Mar. 4, 1999

(86) PCT No.: PCT/US99/04683
§ 371 (c)(1),
(2), (4) Date: Aug. 31, 2000

(87) PCT Pub. No.: WO99/44927
PCT Pub. Date: Sep. 10, 1999

Related U.S. Application Data

(60) Provisional application No. 60/107,183, filed on Nov. 5, 1998, provisional application No. 60/092,334, filed on Jul. 10, 1998, and provisional application No. 60/076,974, filed on Mar. 4, 1998.

(51) Int. Cl.[7] .............................................. B65G 67/24
(52) U.S. Cl. ....................................... 414/337; 414/392
(58) Field of Search ................................ 414/337, 392, 414/399, 917, 344, 391, 744.3, 744.5; 220/1.5; 294/81.61, 81.55

(56) References Cited

U.S. PATENT DOCUMENTS

| 1,974,837 A | * | 9/1934 | Shillinger et al. | ........ 414/744.5 |
| 3,910,196 A | * | 10/1975 | Denenburg | .................. 414/392 |
| 4,370,085 A | * | 1/1983 | Barry | .......................... 414/337 |
| 4,746,257 A | * | 5/1988 | Barry | .......................... 414/392 |
| 5,219,261 A | * | 6/1993 | Barry | .......................... 414/392 |
| 6,227,793 B1 | * | 5/2001 | Knighten | .................. 414/744.5 |

FOREIGN PATENT DOCUMENTS

| DE | 2717199 | * | 11/1978 | ................. 414/337 |
| DE | 3542190 | * | 11/1985 | ................. 414/337 |

* cited by examiner

Primary Examiner—James W. Keenan
(74) Attorney, Agent, or Firm—Gifford, Krass, Groh, Sprinkle, Anderson & Citkowski, P.C.

(57) ABSTRACT

This is a loader moved by a train to cross over the train to transfer cargo, mail, baggage, express, passenger, or freight containers from and to railway cars in the train. A revolving jib crane or skewed traveling crane with depending parallelogram linkage supports a single or double sided loadspreader which is engaged by the train to swing up to engage and lift the container or its hooks and directs a force to move the loadspreader across the car to lift, push, pull, or roll containers off and on the car simultaneously and unlock and lock containers on the car. It includes side, top, bottom, and end lift loadspreaders. It removes and inserts containers on trains in either direction and moves and turns them to station platforms or interfaces with a conveyor or other vehicle or dumps bulk containers with successive loaders and recrosses the train to return the containers to the same cars or to the starting side of the train. It transfers containers between trains on different tracks. Loadspreaders and carriers can be preaccelerated to couple closer to train speed. Containers for passenger trains have keystone shaped sides or tapered end hoods to seal the container to car ends yet open clearance when lifted. Moving train operated overpass transfer also is applicable to material handling, and amusement rides and as an action toy.

19 Claims, 21 Drawing Sheets

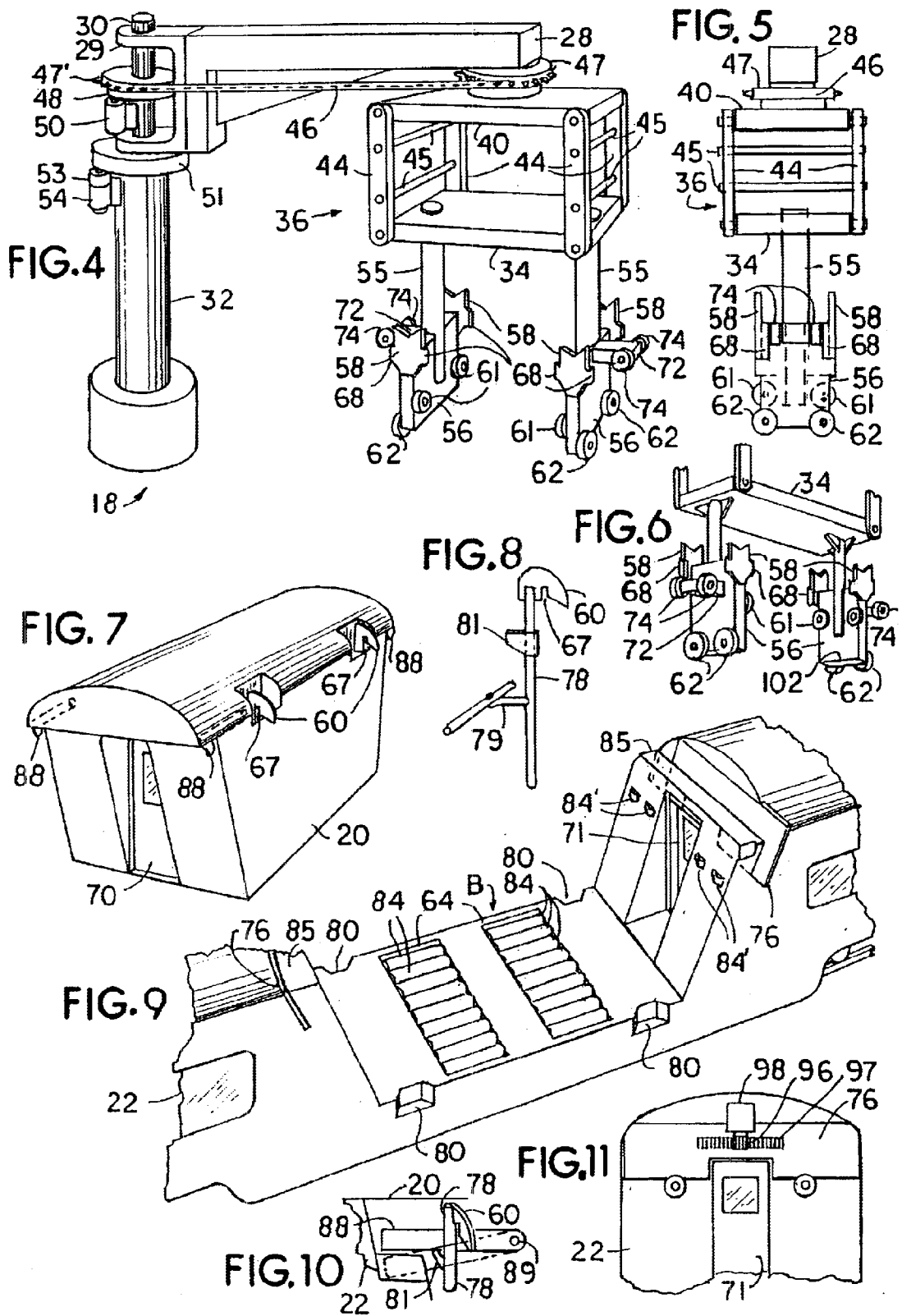

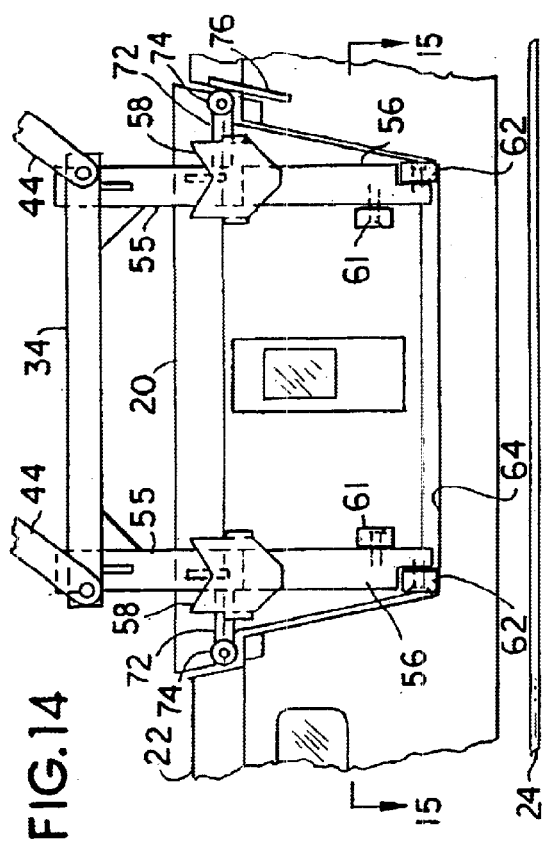
FIG.14
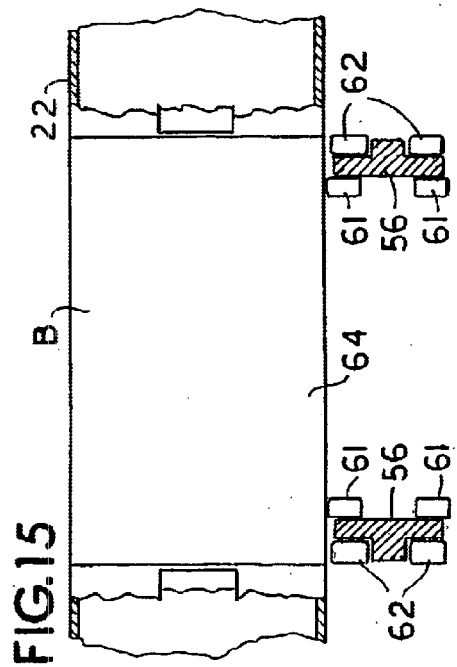
FIG.15
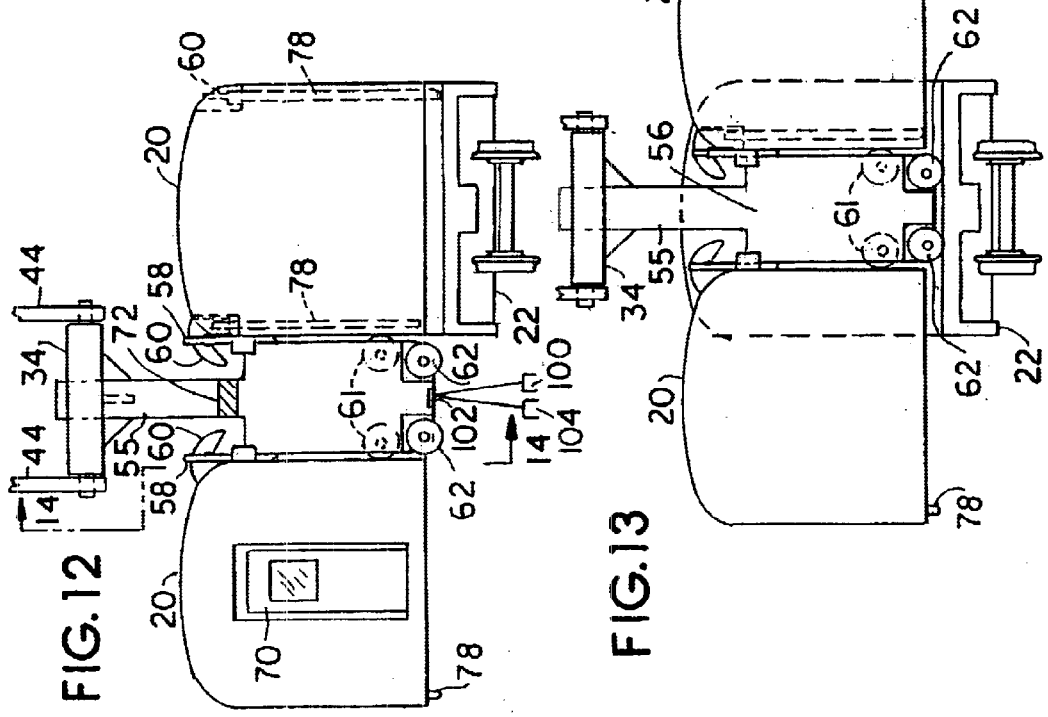
FIG.12
FIG.13

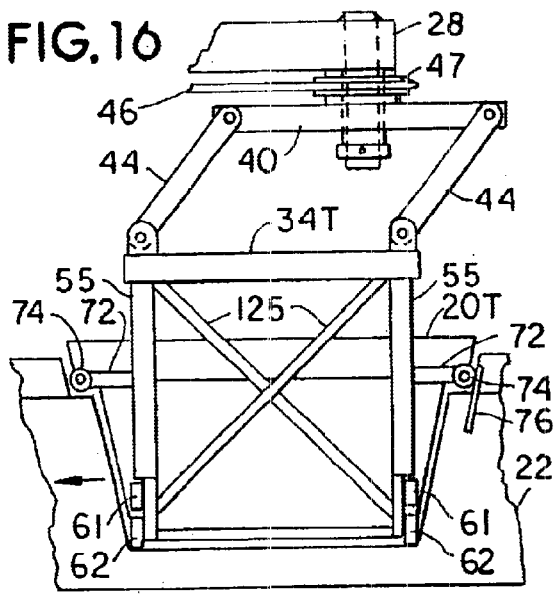
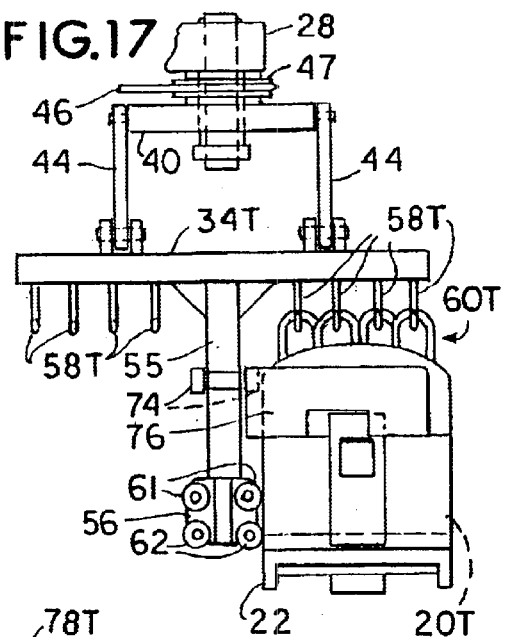
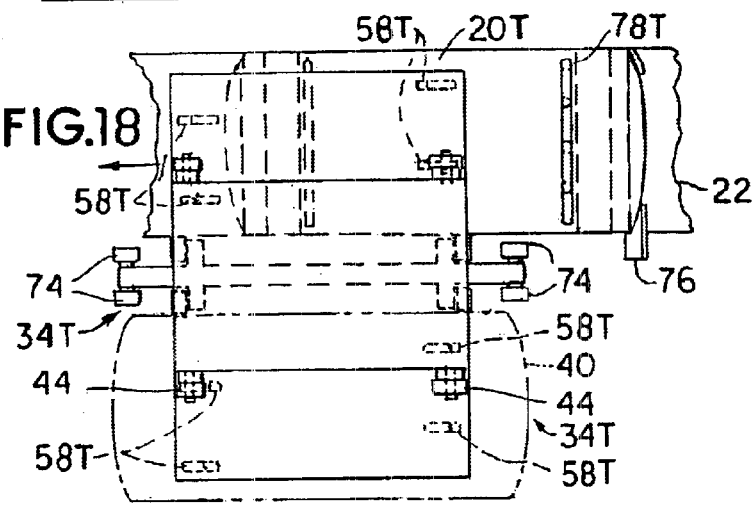
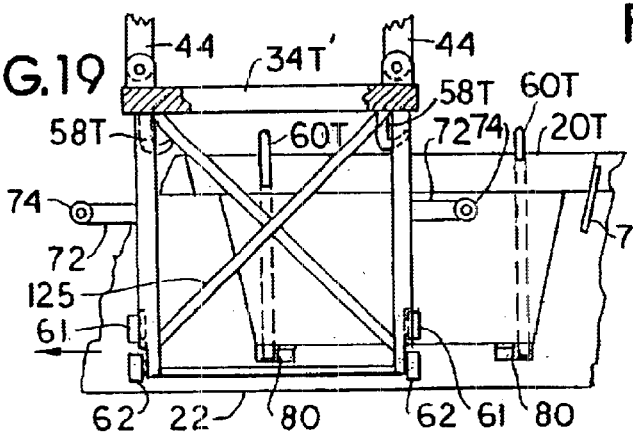
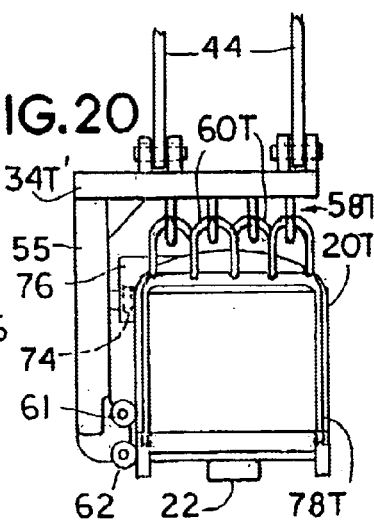

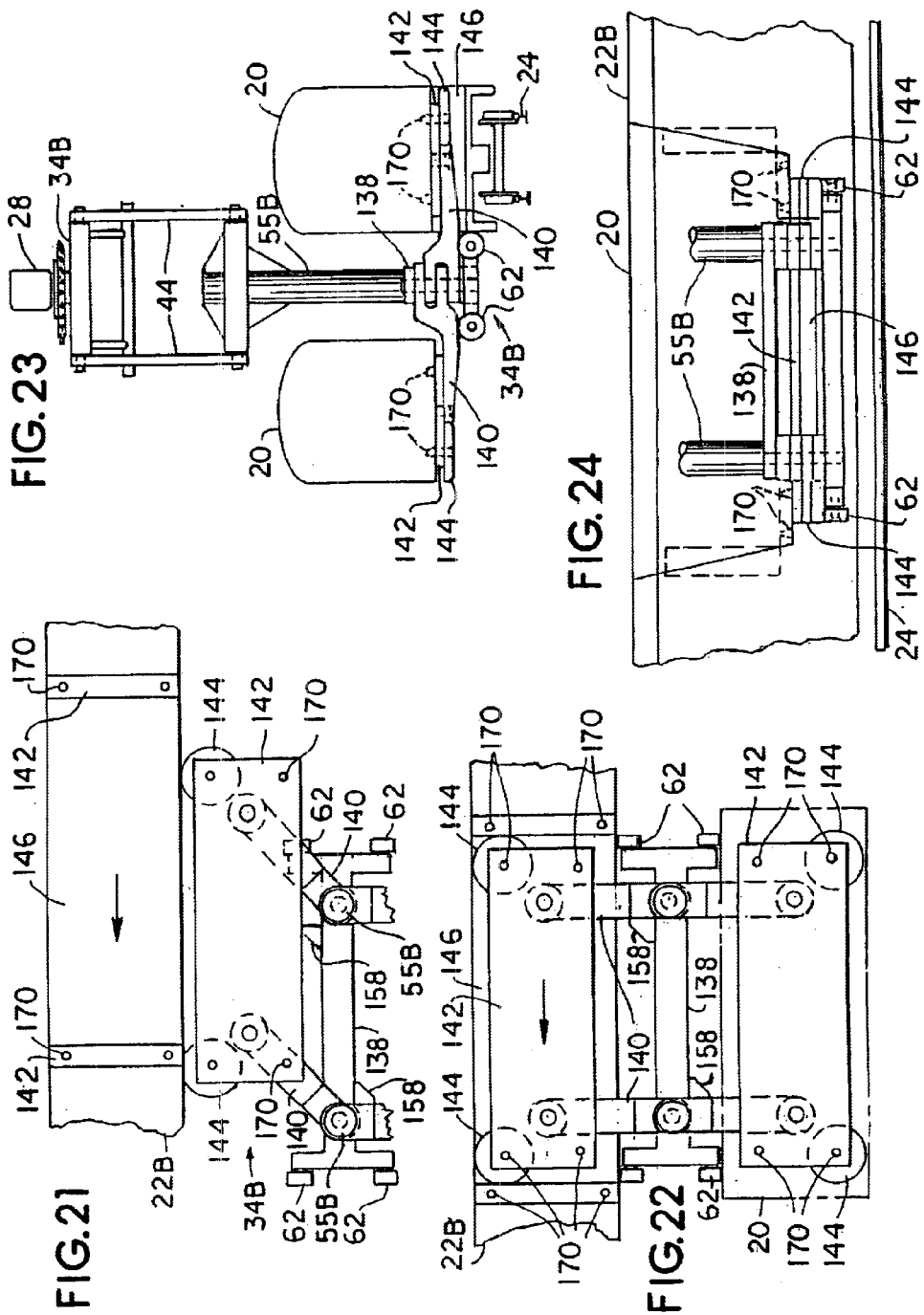

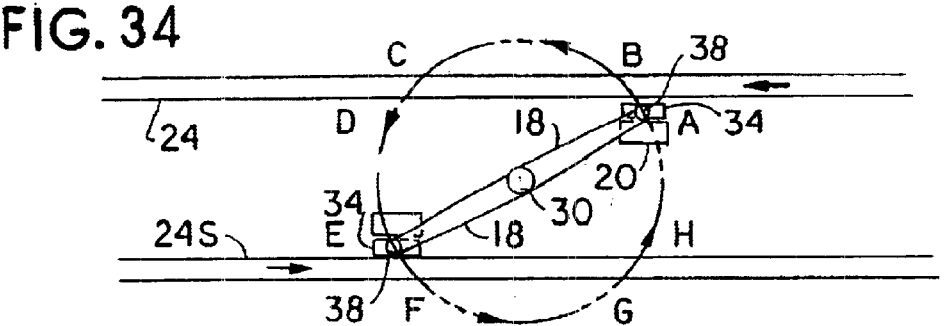
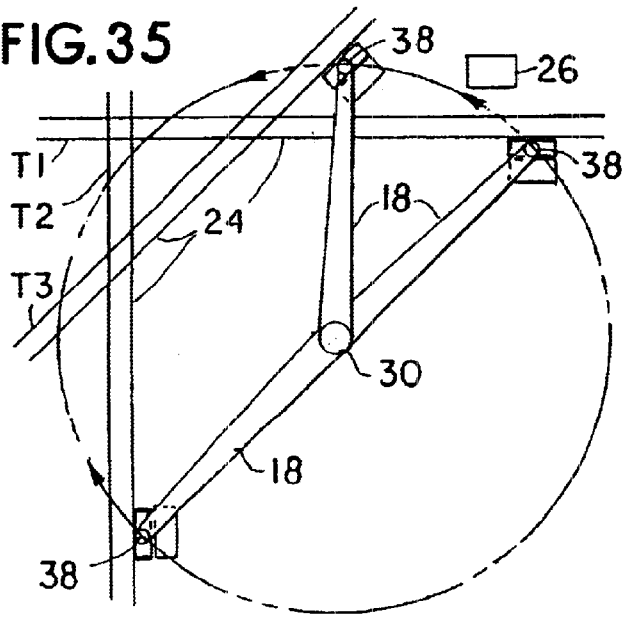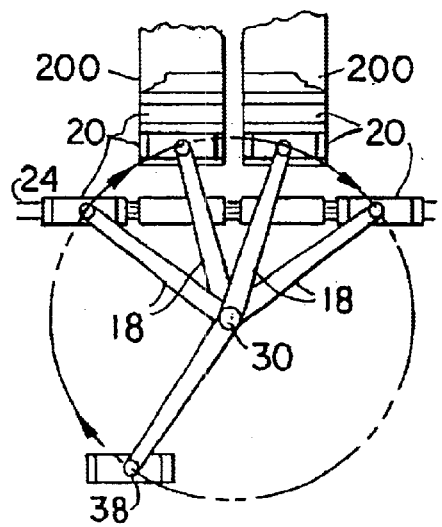
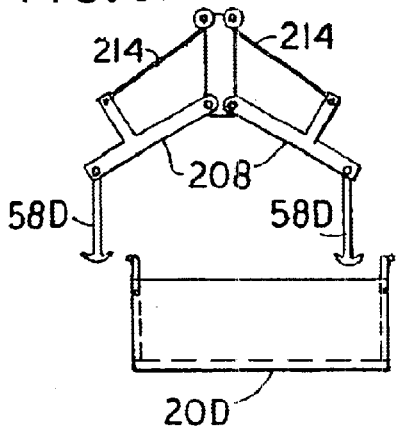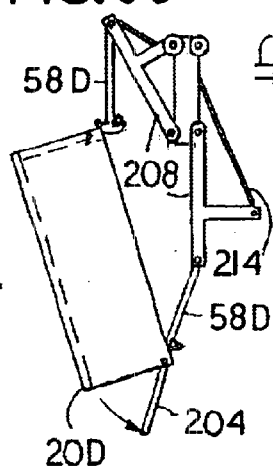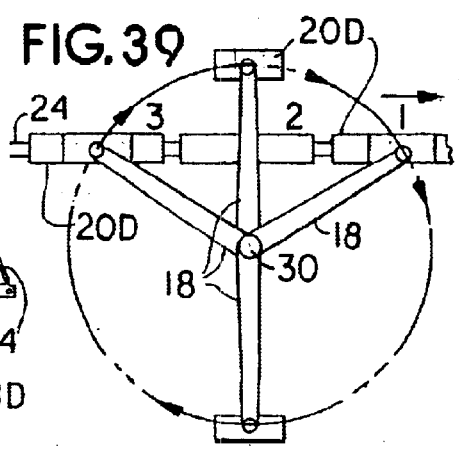

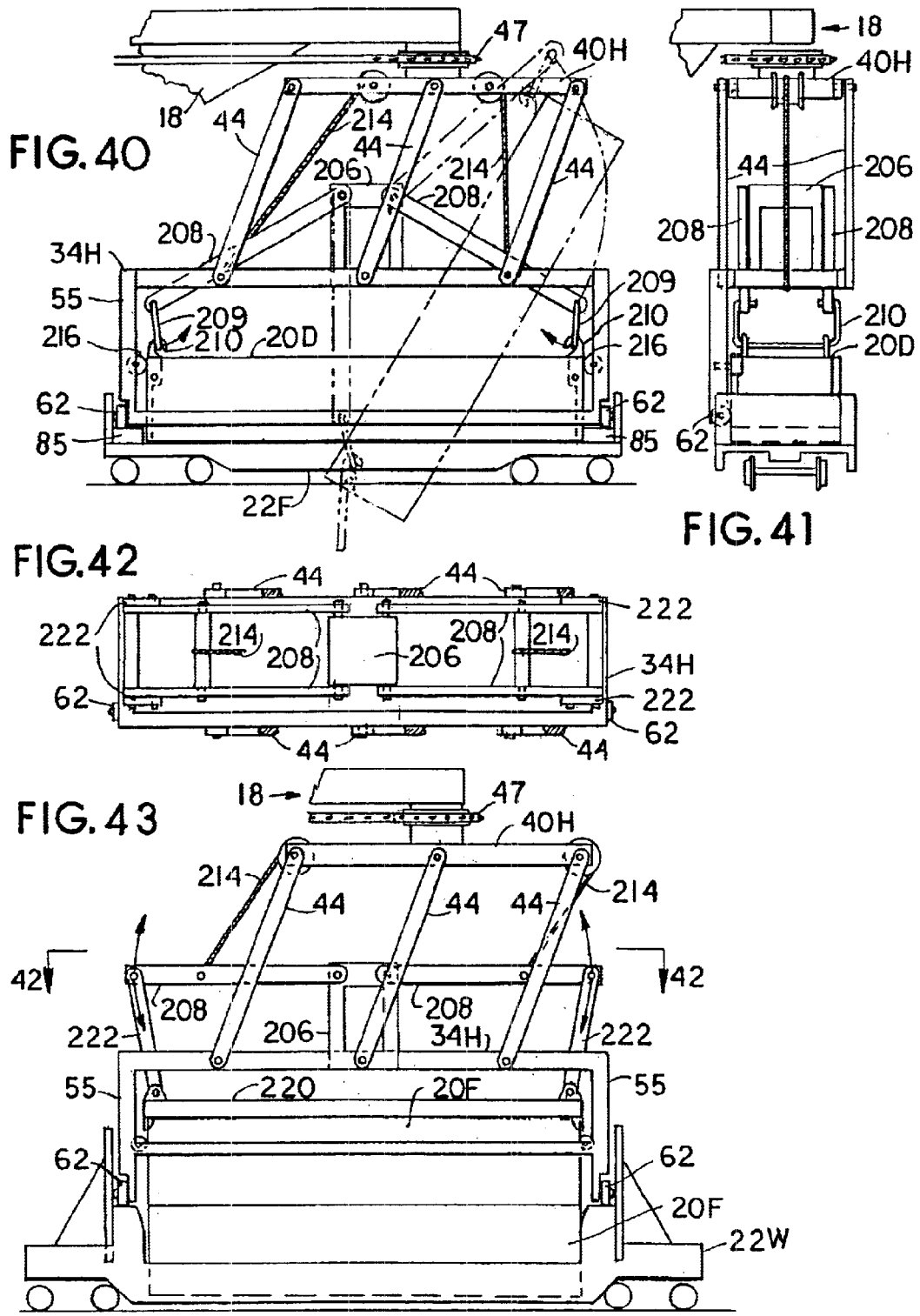

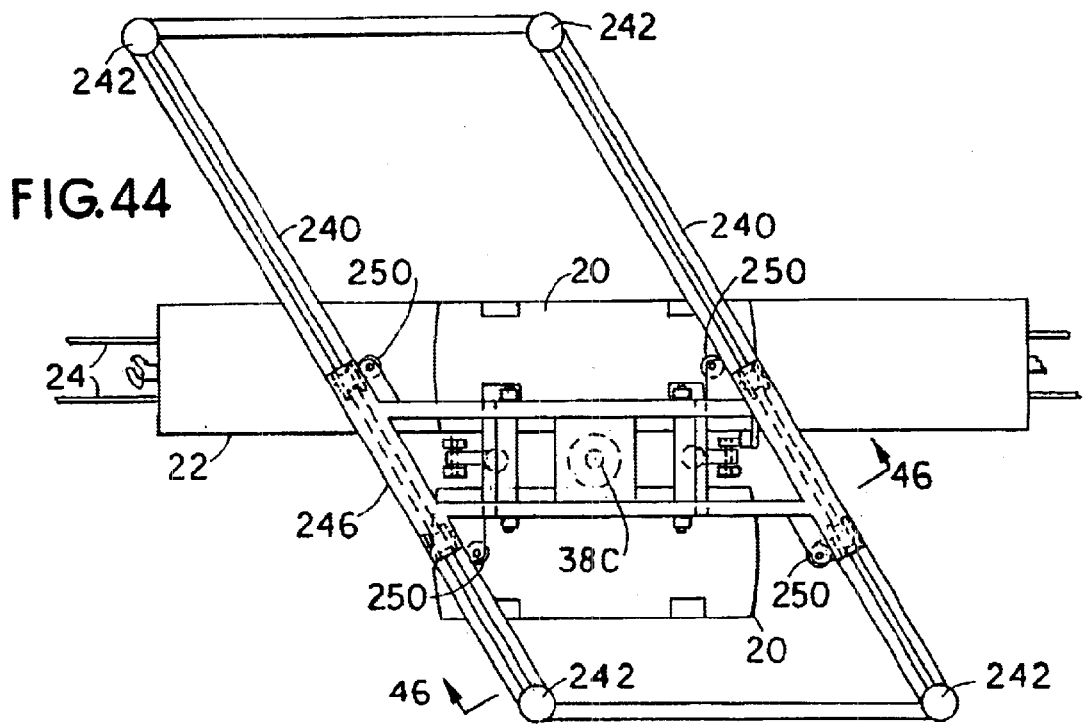
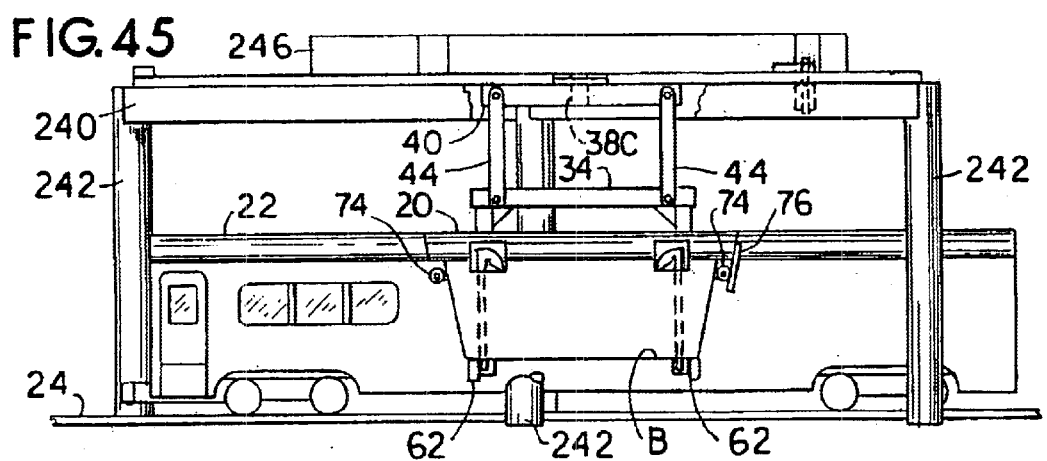
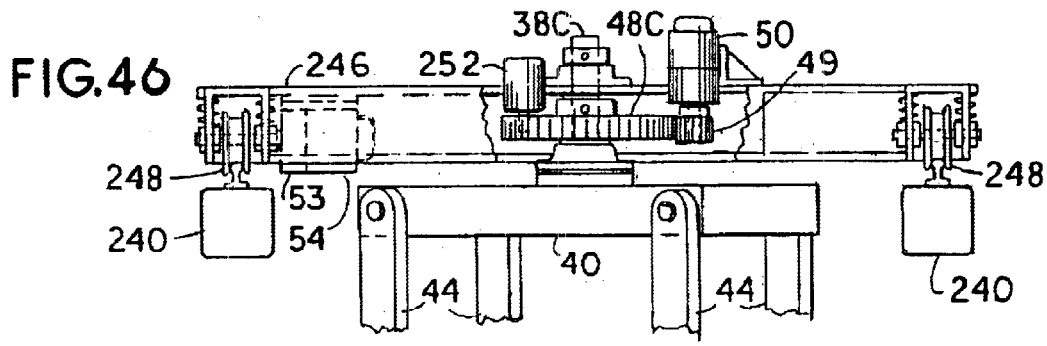

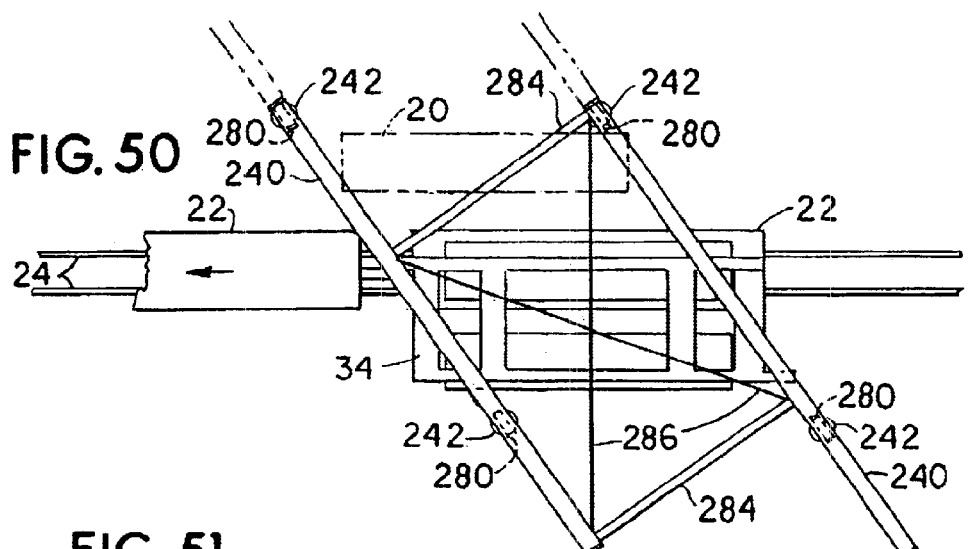
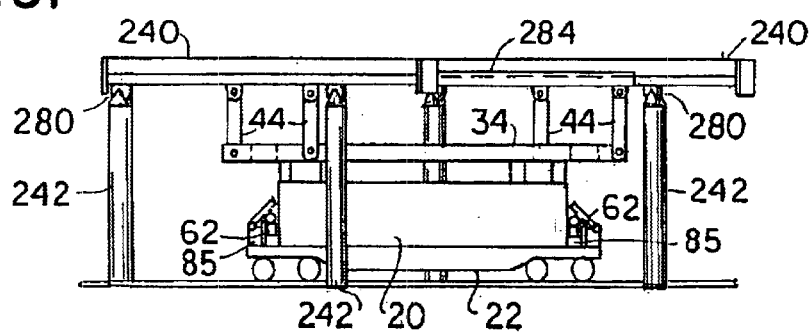
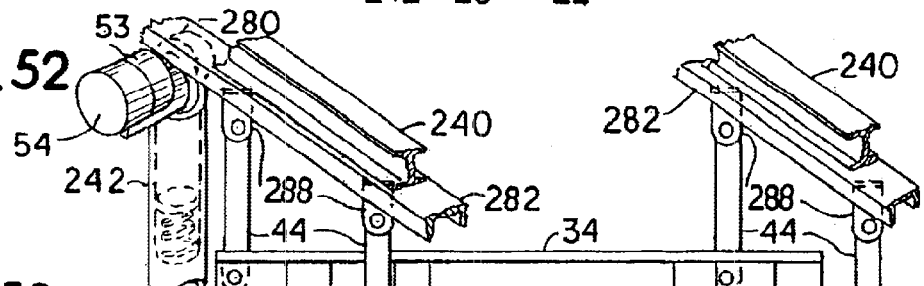
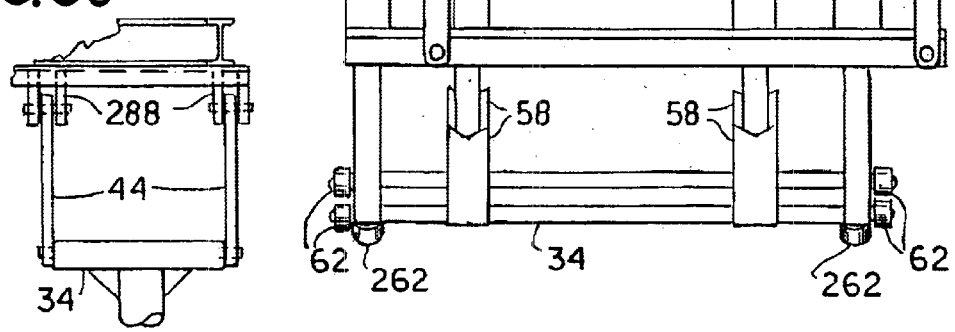

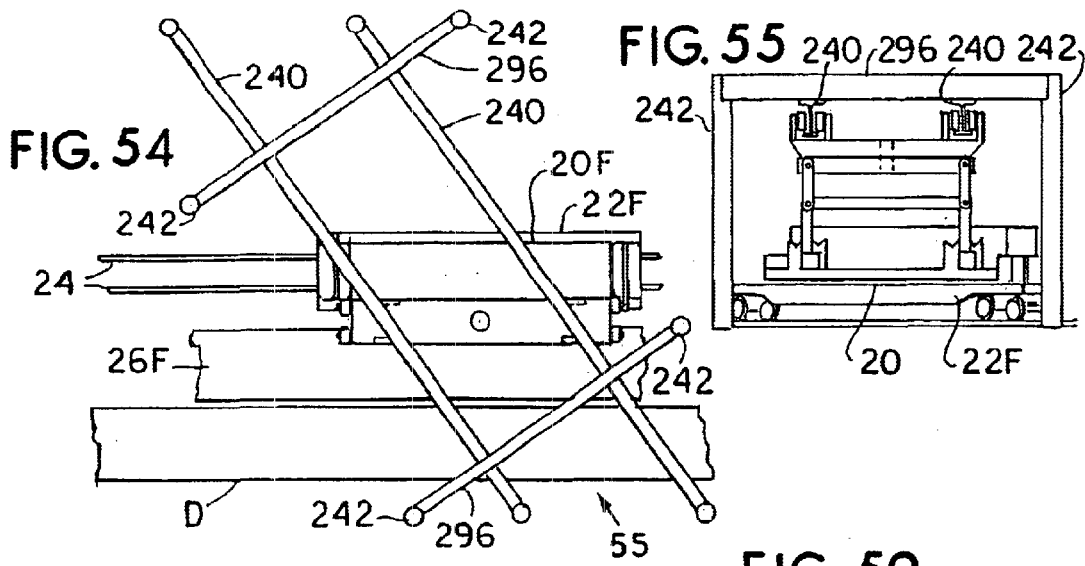
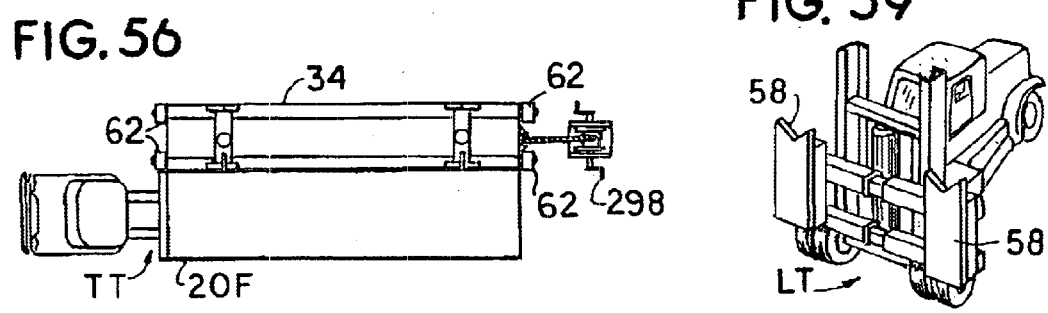
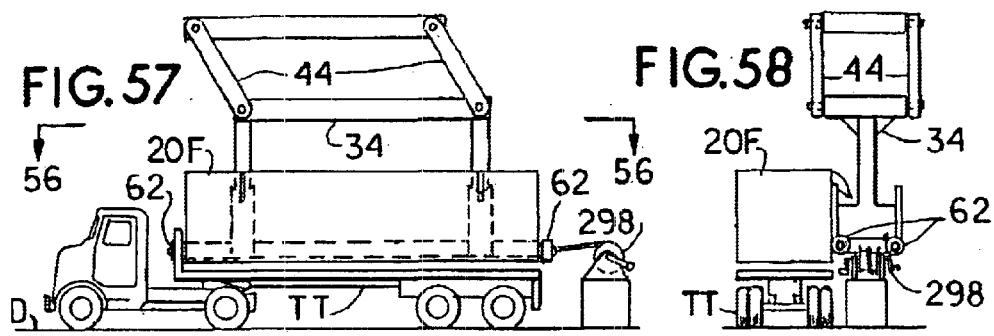
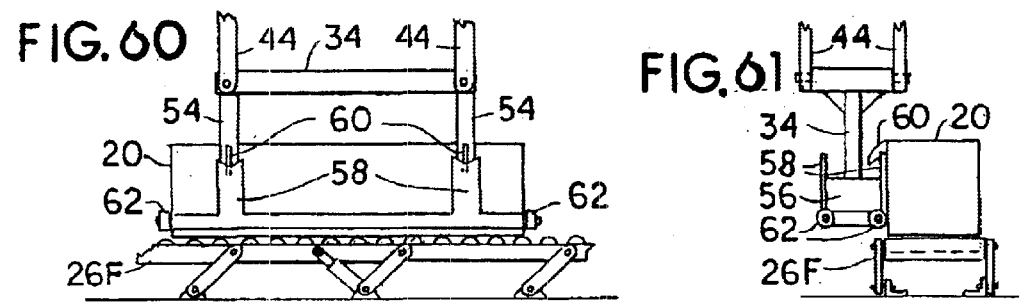

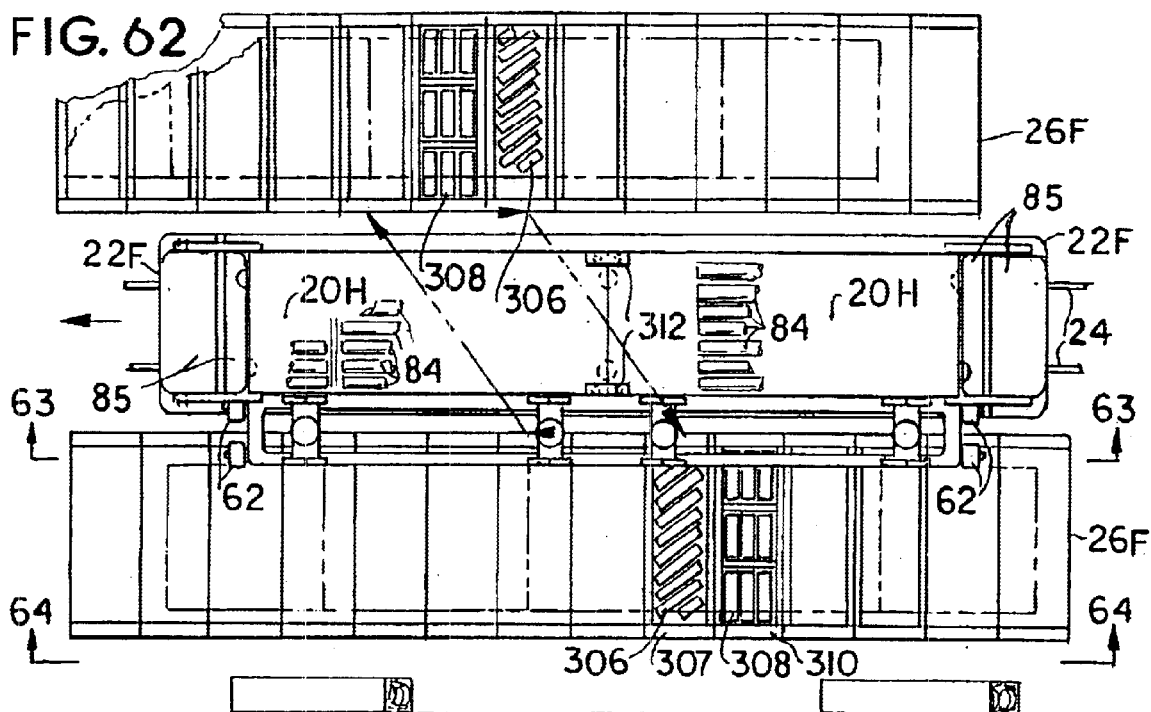
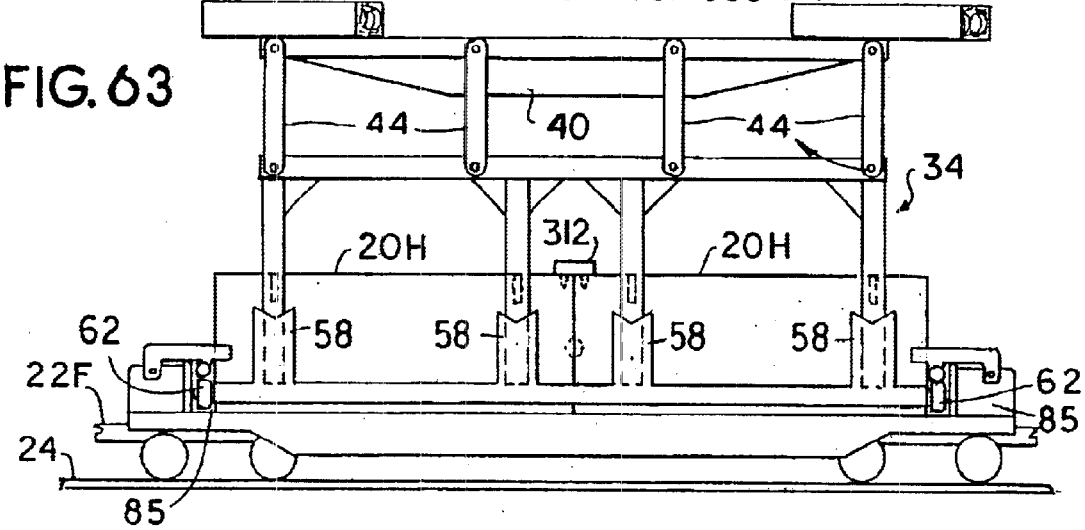
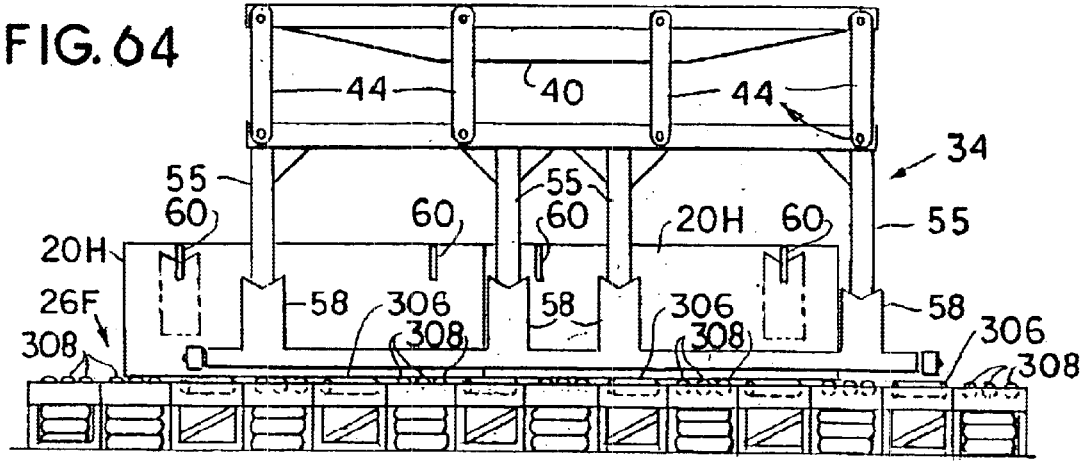

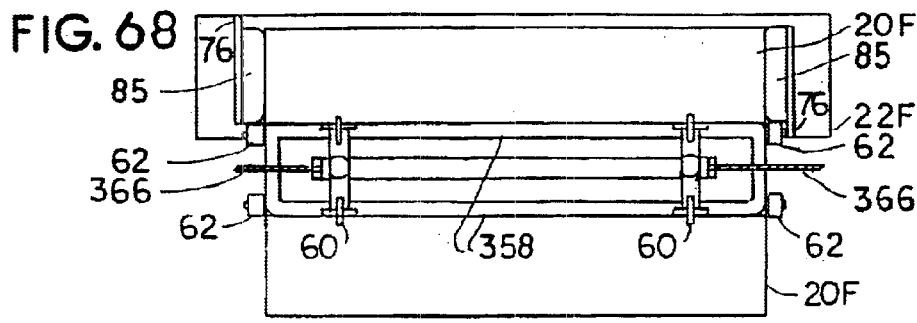
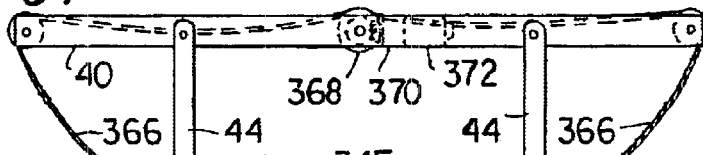
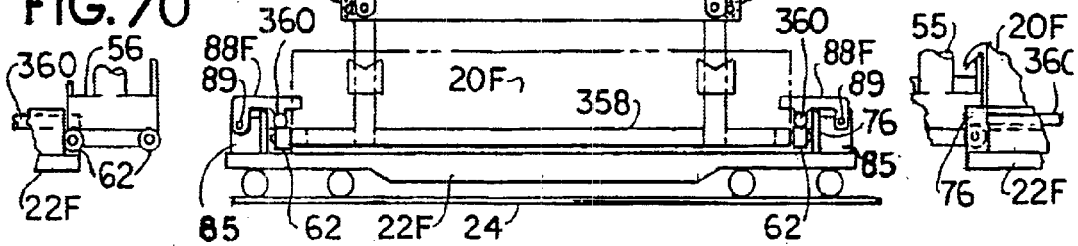
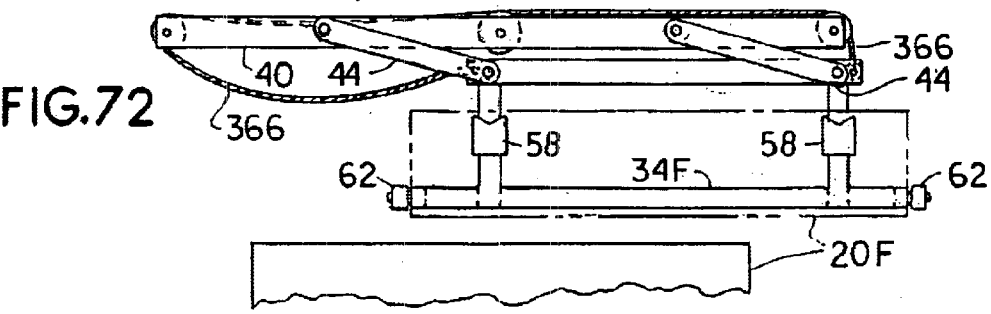
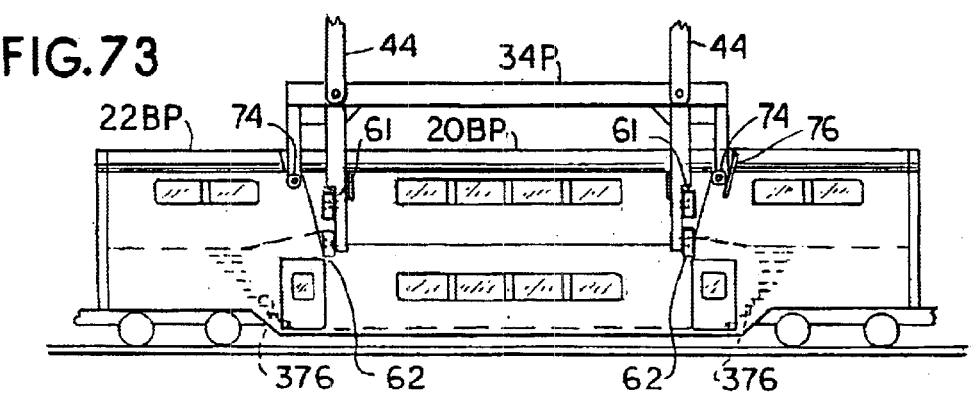

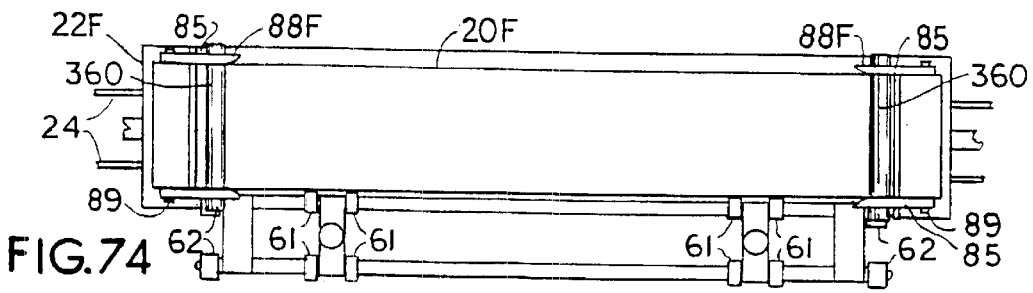
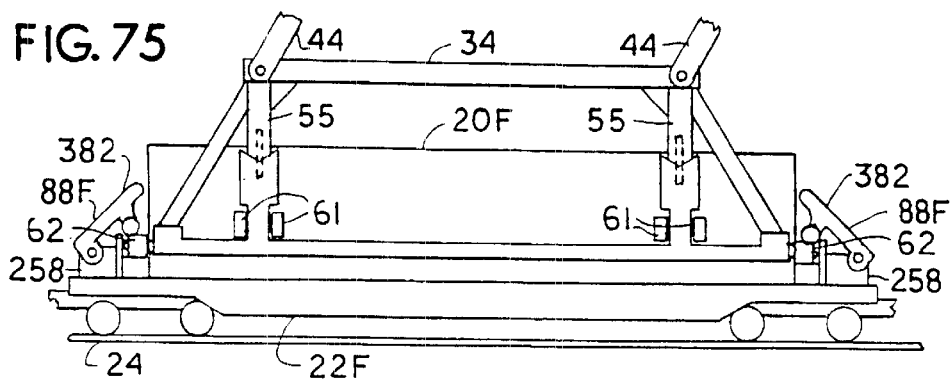
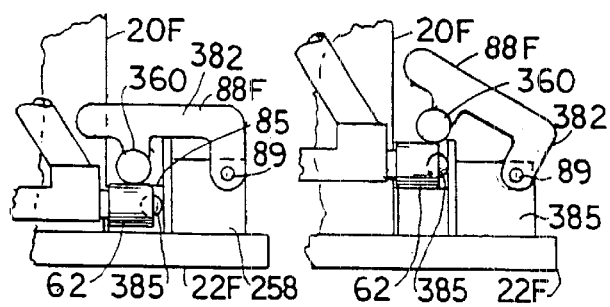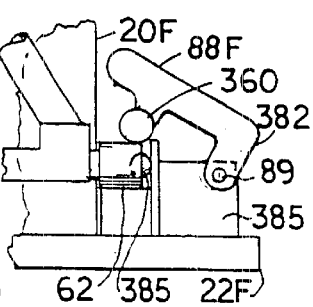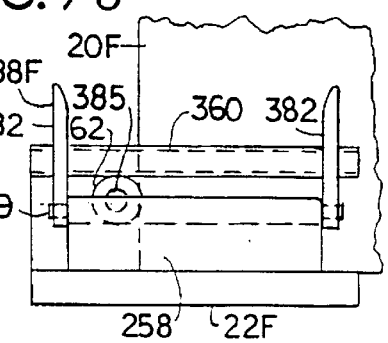
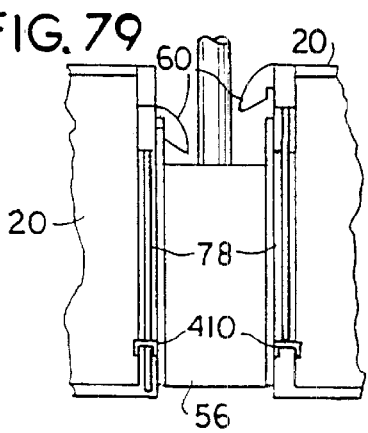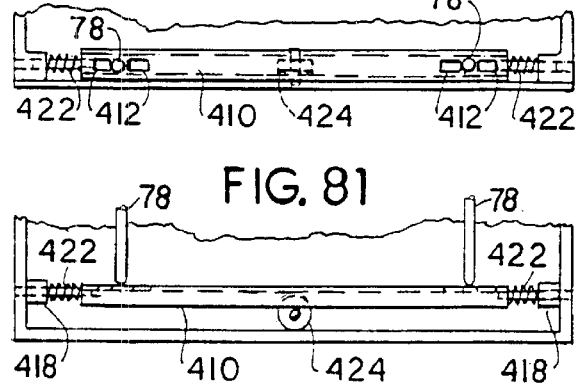

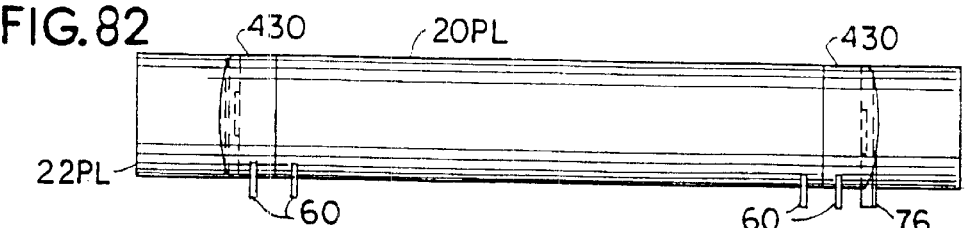
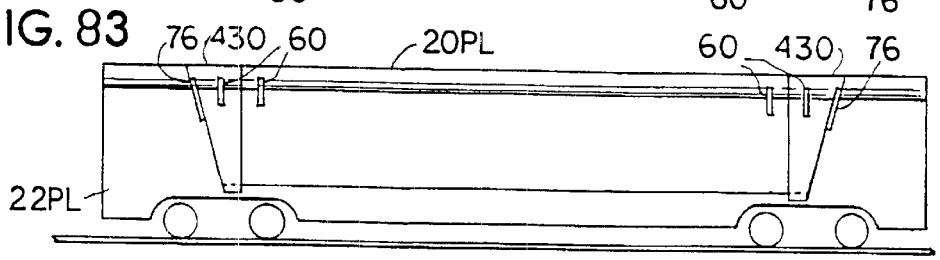
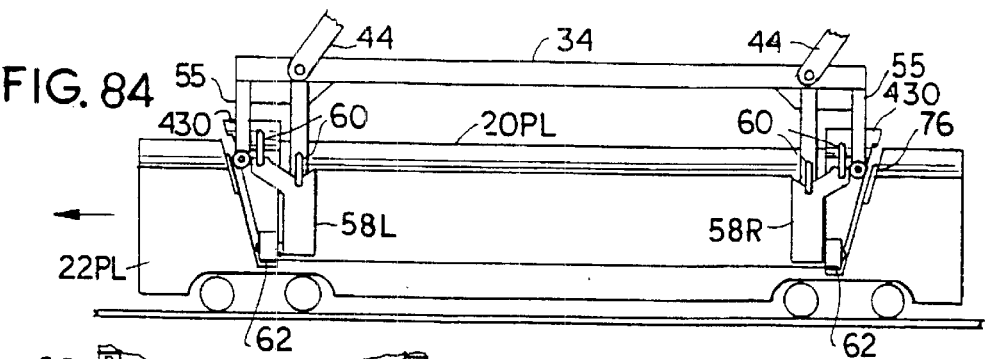
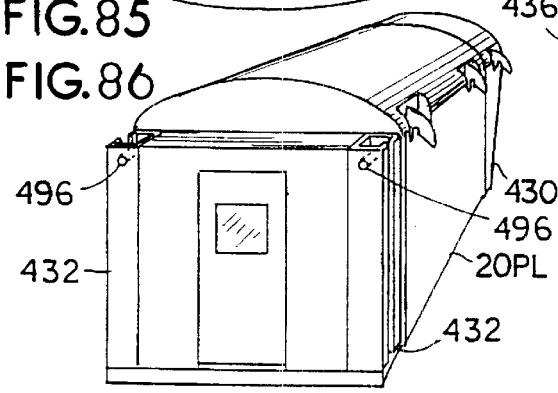
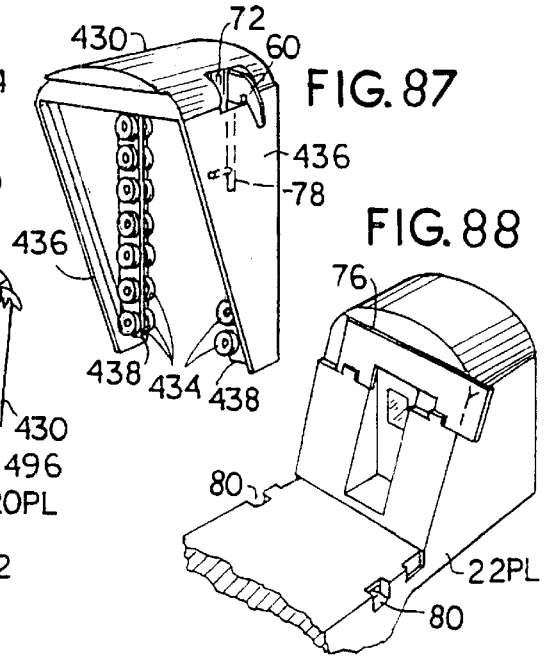
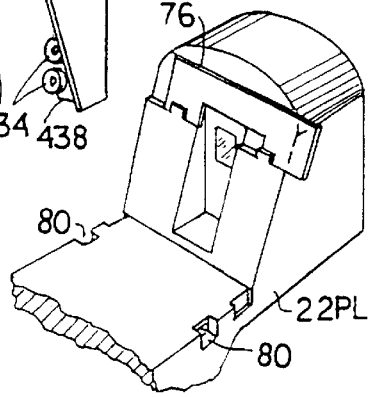

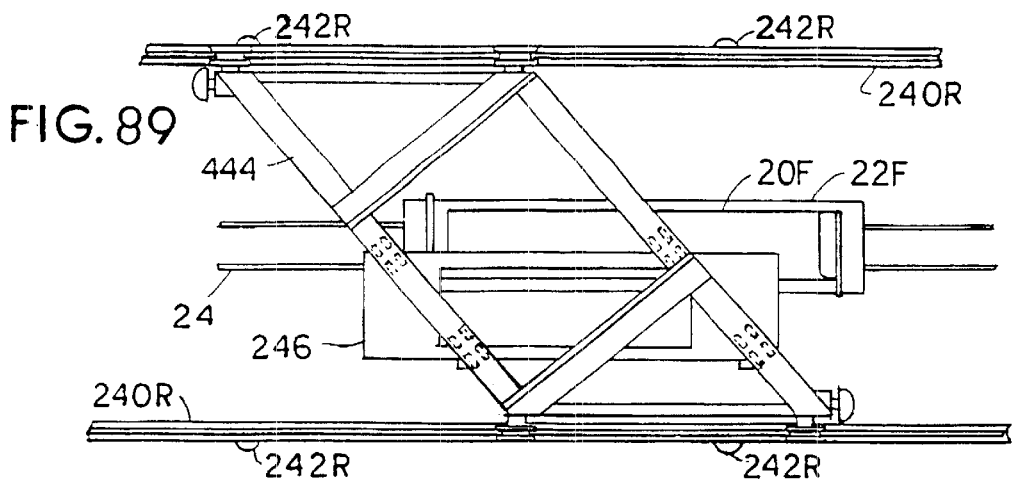
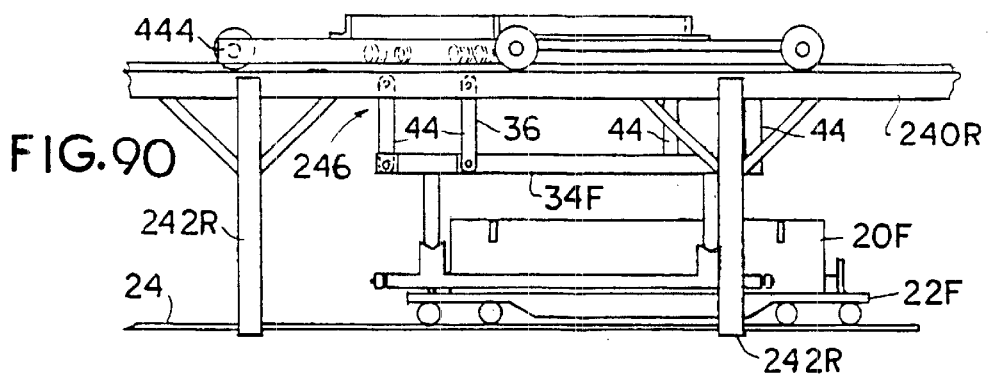
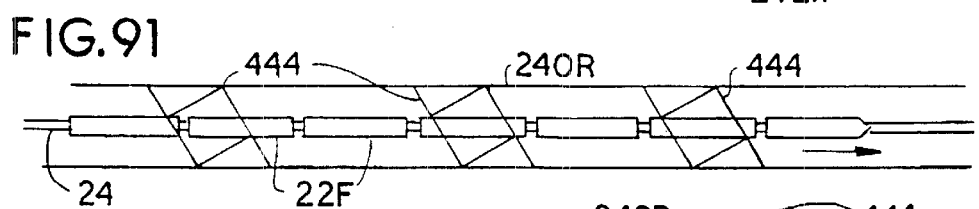
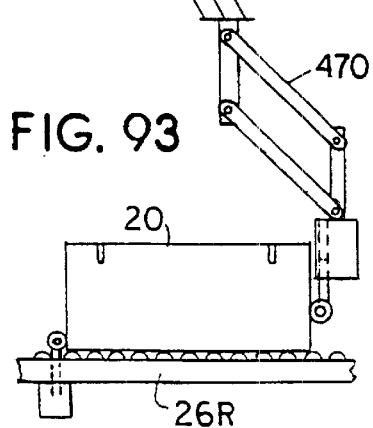
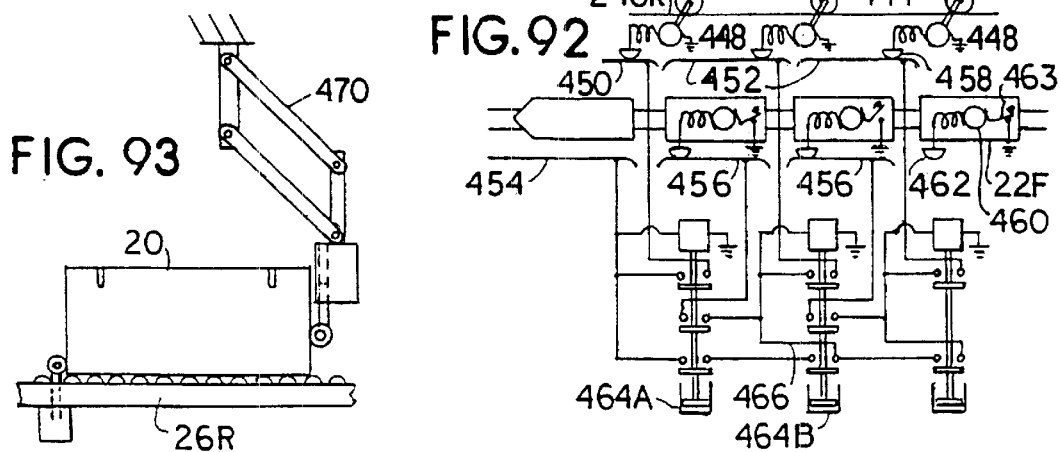

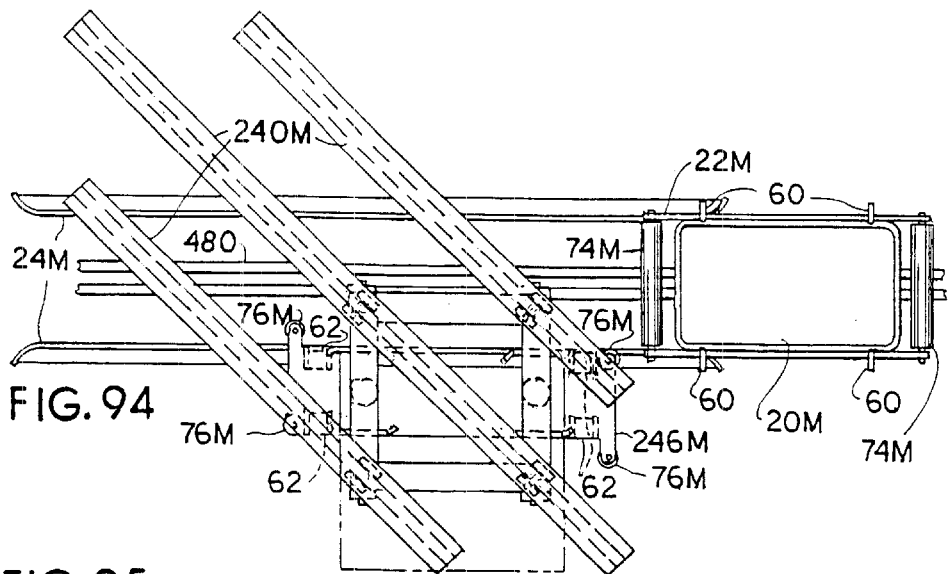
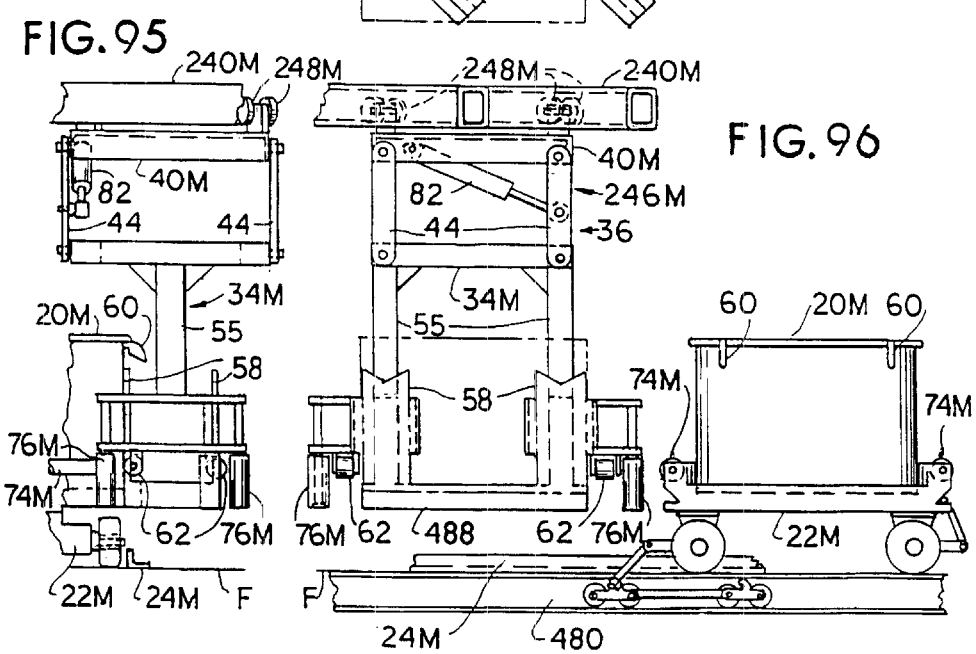

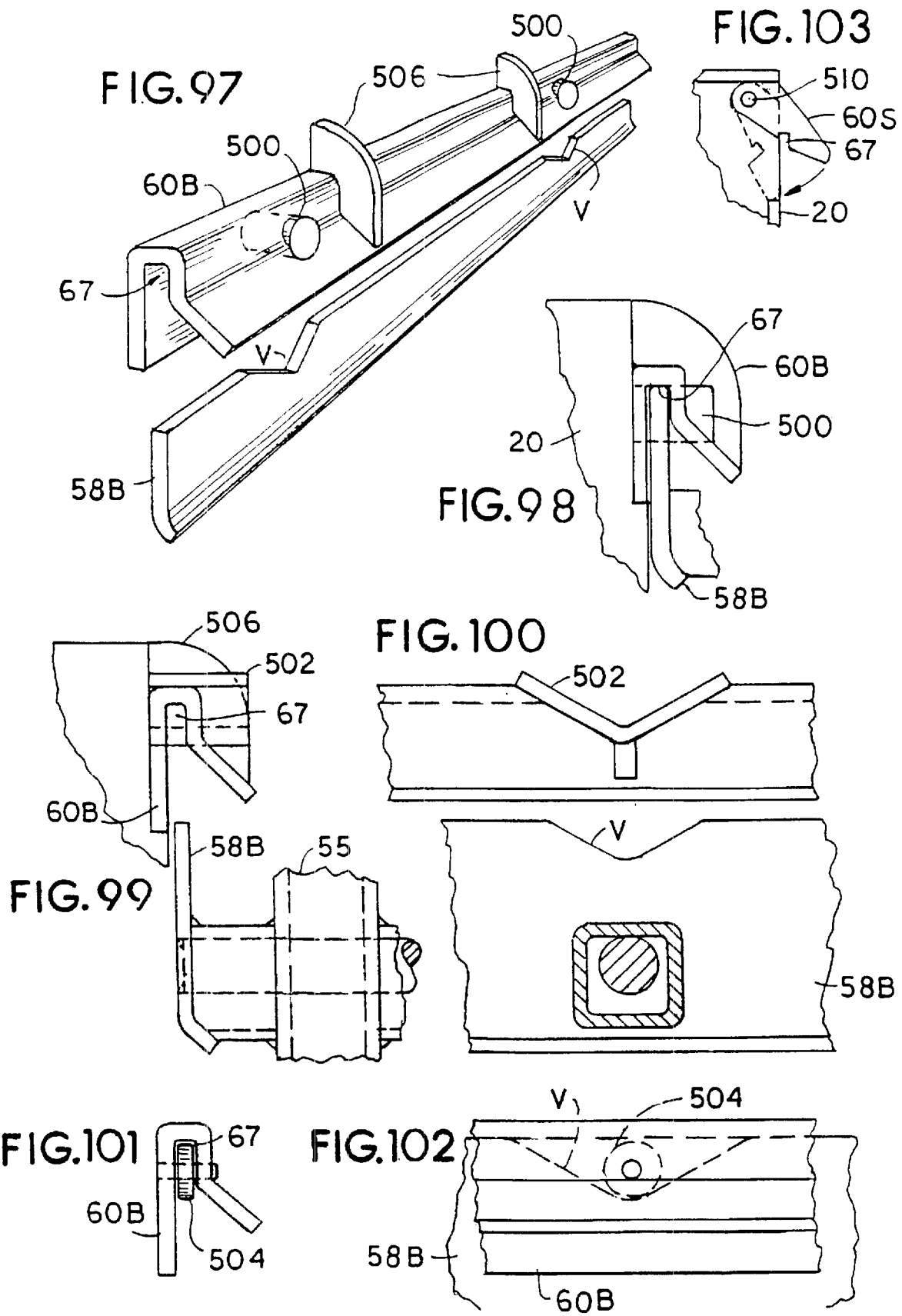

CONTAINER TRANSFER CROSSOVER AND SYSTEM

CROSS REFERENCE TO RELATED PATENTS

This invention is a continuation of my pending U.S. Provisional Patent Applications Nos. 60/076,974 filed Mar. 4, 1998, and No. 60/092,334, filed Jul. 10, 1998, and No. 60/107,183 filed Nov. 5, 1998, and relates in part to my PCT U.S. Patent Application No. PCT/US98/115336, filed Jun. 4, 1998, and to lesser extent to other of my patents on rotary loaders.

This is an overpass transfer device and system for transferring such things as passengers, cargo, and bulk dump containers, racks or parts boxes between trains and stations, conveyors or other vehicles or storage spots. This invention includes the transfer cranes, containers, cars and stations that make this system. The containers for passenger trains are of car width and made as a removable section of the car body to be replaced by an equivalent section put in its berth on the car with one pass of the loader. The passenger containers are preferably keystone shaped as viewed from the side, so when lifted up from their berth in the car they open up clearance at each end from the car body which fits against the container when set down thereon. The container is lifted by a parallelogram linkage frame suspended from a jib crane or overhead diagonal across-the-track traveling crane, or cranes depending from an overhead wheel or track.

It is an object to provide a loader for transfer of a container to and another from a spot on a train or vehicle simultaneously in either direction. It is a further object to transfer in a substantially horizontal plane.

It is an object to provide a convenient container transfer station crane with self-engaging loadspreader for transfer of one or more containers from and/or to a car in a moving train with one transfer crossover and further to do this using only the train's movement to power the loader during transfer and further to do this with minimum lifting of the containers.

It is an object for the loader to transfer during its crossover of a train in an arc or diagonal in the direction of the train's movement and clear the train after the crossover. It is a further object to then empty or unload the container and move the loader to re-engage the train to recross over the train and a further object to set the container on the same car and berth from which it was removed.

It is an object to provide a safe, simple, dependable, automatic, and low cost overhead loader operated by the train's movement.

It is an object to have successive loaders on the same support transfer successive and selected containers either from or to the train or both.

It is an object to keep the loadspreader parallel to the train car while crossing the train and to turn it end for end if needed for the next transfer.

It is an object to lift the loadspreader with or without a container and pass back above the train if desired.

It is an object to remove and deposit containers on a vehicle in one transfer pass over the vehicle.

It is an object to use a parallelogram swinging linkage as the container transfer hoist, which will lift automatically as needed for clearance.

It is an object to provide one hoist for both the outgoing and incoming containers.

It is an object to remove a container and insert another in the same spot on a railway car or other vehicle moved to swing the loadspreader on links to lift, shift sideways, and lower by gravity while aligned for transfer.

It is an object to provide straight across the car coupling between the car and the loadspreader with close alignment from either side of the car depending on direction of movement.

It is an object to provide a keystone shaped container in side view and further to provide cars with one or more berths each extending across the car with ends of the berth sloped to fit, hold, and seal the container as desired.

It is desired to provide a tapered hood for enclosing each end of a container to seal to the car ends and open end clearance when the hoods are lifted.

It is an object to accurately position and pin the container on the car and to release the pins when the container is engaged by the loadspreader and either lifted or supported to roll out of the car while held by the loadspreader.

It is an object to provide container transfer with this system between truck and rail vehicles or vehicles of different width.

It is an object to provide lift hooks on the container which lift to unlock the container from the transport vehicle before being lifted farther to keep the hook engaged if not lifting the container during transfer.

It is a further object to preaccelerate the container to coupling speed before coupling a vehicle above coupling speed.

It is an object to provide these features also for material handling, amusement rides, and as a toy as well as full size.

These other and further objects and features should become evident to those skilled in the art by study of this specification with reference to the drawings wherein:

FIG. 4 is a perspective view of the loader.

FIG. 5 is an end elevation of the loader's hoist and loadspreader for side coupling and lifting the containers.

FIG. 6 is a perspective view looking up at the loadspreader.

FIG. 7 is a perspective view of the container.

FIG. 8 is a side view of a container lift hook and rod.

FIG. 9 is a perspective view of a portion of the car showing an empty berth for the container.

FIG. 10 is a side view of a container hook latch.

FIG. 11 is a partial cross sectional view inside the car looking toward the container berth to show a side coupling plate.

FIGS. 12 and 13 are cross sectional elevations of the car passing the loader taken respectively when the side hooks are engaged and when in the center of transfer.

FIG. 14 is a side elevation taken on line 14—14 of FIG. 12.

FIG. 15 is a plan section taken on line 15—15 of FIG. 14.

FIGS. 16 and 17 are respectively side and end sectional elevations of a container being lifted from the car by a top lifting loadspreader on the loader.

FIGS. 18 and 19 are respectively plan and side views of the lift for the container of FIGS. 16 and 17 aligned for transfer with car from the right.

FIG. 20 is an end elevation of FIG. 19 but with a single container lift loadspreader.

FIGS. 21 and 22 are successive plan views of a double pivot bottom lift loader engaging a train respectively when side coupling and when extended under a container for transfer from the train.

FIG. 23 is an end elevation of the loadspreader with containers in position of FIG. 22.

FIG. 24 is a side elevation of the car of FIG. 22 with a container on the loader's lift arms in its berth.

FIG. 34 is a schematic station and track plan for two directional operation.

FIG. 35 is a schematic station and track plan for a loader to serve three intersecting rail lines and for transfer therebetween.

FIG. 36 is a schematic station plan of successive loaders setting off and picking up containers from conveyors indexing between unloading and reloading the car after moving three car lengths.

FIGS. 37 and 38 are side elevations of a dump loadspreader respectively engaging and dumping a dump container.

FIG. 39 is a plan view of a dump station for receiving, dumping, and returning the dump containers to the same cars.

FIGS. 40 and 41 are respectively side and end elevations of a variation of the hoist and loadspreader on the jib crane engaging an end dump container on a car and shown dumping in phantom.

FIGS. 42 and 43 are respectively sectional plan and side views of a hoist with loadspreader engaging cargo containers on a well car, FIG. 42 being taken on line 42—42 of FIG. 43.

FIGS. 44 and 45 are respectively plan and side elevation views of a crossover station with a skewed gantry crane replacing the jib crane of FIG. 1 to provide a constant angle of traverse.

FIG. 46 is a partial section on line 46—46 of FIG. 44 to larger scale.

Figure 47:
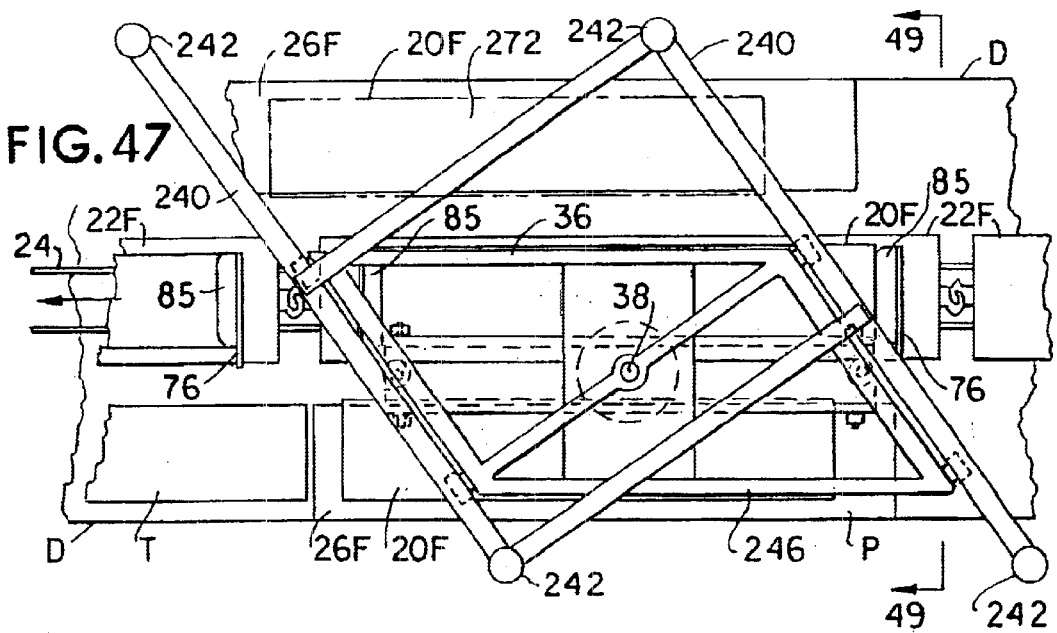
Figure 48:
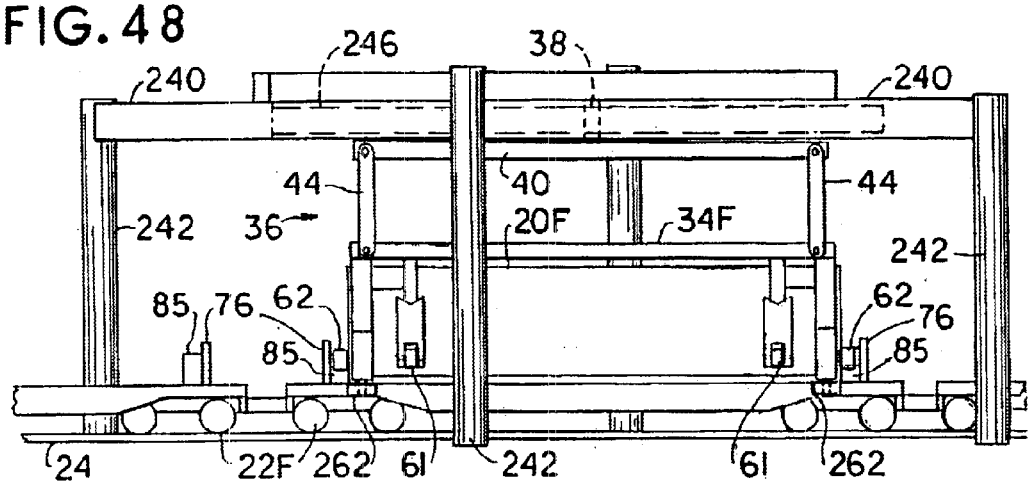
Figure 49:
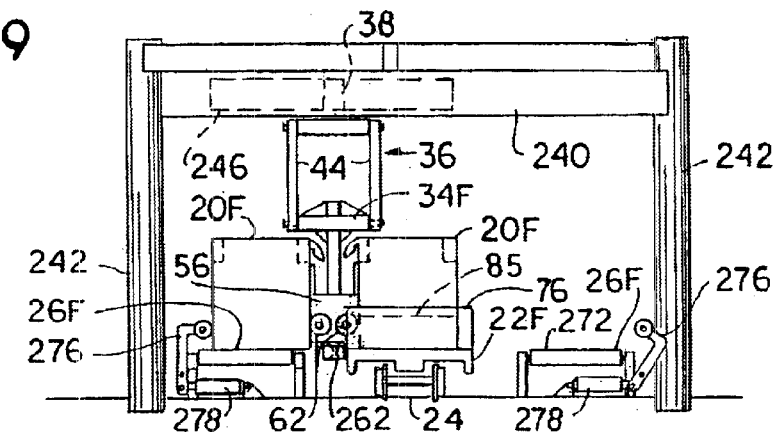

FIGS. 47, 48, and 49 are respectively plan, side, and end views of a skewed crane crossover station with loader handling a cargo container for highway—rail transfer, FIG. 48 being minus the near container and FIG. 49 being taken in the direction of arrows 49 in FIG. 47.

FIGS. 50 and 51 are respectively plan and side elevations of a variation of the loader with crane supported on roller topped columns to roll at a diagonal across the track.

FIG. 52 is a broken oblique side and top projection of this loadspreader linked to the supporting frame shown with one of the supporting columns.

FIG. 53 is an end view of this loadspreader linked to a traveling crane rail.

FIG. 54 is a plan view of a larger station similar to FIG. 47 to smaller scale.

FIG. 55 is an end elevation taken in the direction of the arrow 55 in FIG. 54.

FIGS. 56, 57, and 58 are respectively plan, side and end views of a track to rail transfer with the loadspreader at the station to a larger scale.

FIG. 59 is a perspective view of a lift truck for the side hook container.

FIGS. 60 and 61 are respectively side and end elevations of a lift table for the station of FIG. 54 engaging a container on a loadspreader.

FIG. 62 is a plan view of station roller bed platforms at the same level as car bed for roll-on roll-off transfer, so the hooks need not lift the containers for transfer.

FIGS. 63 and 64 are aligned side elevations on lines 63—63 and 64—64 of FIG. 62, the containers in FIG. 64 being positioned on the roller bed for engagement when the loadspreader is swung up.

Figure 65:
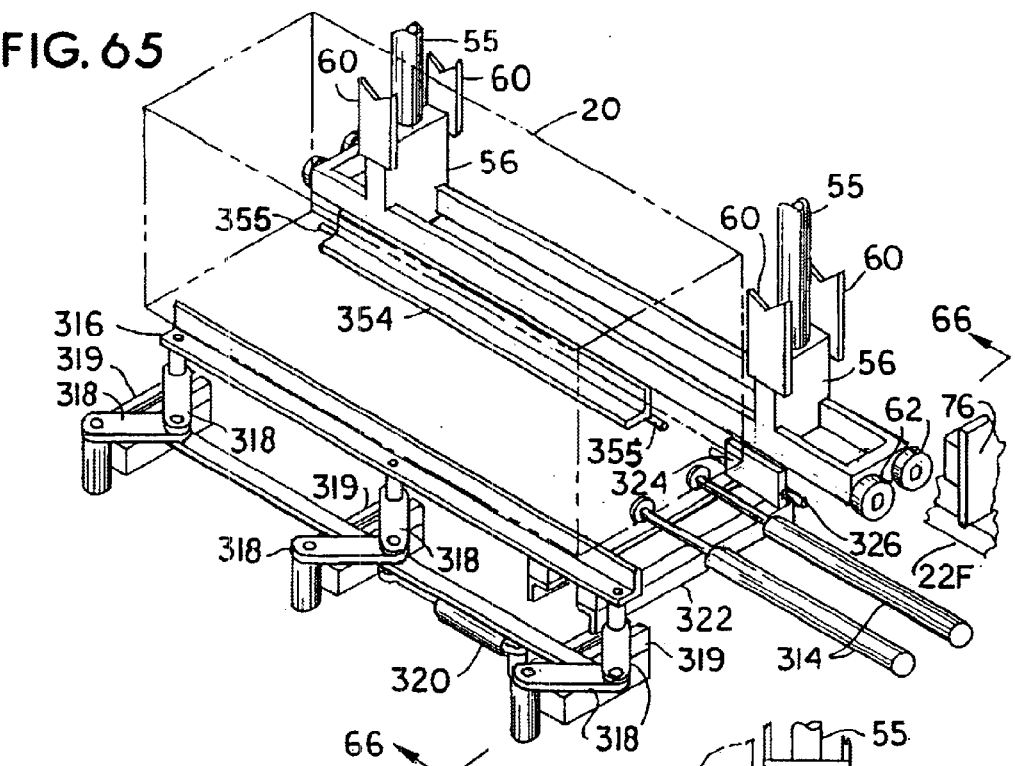

FIG. 65 is an isometric view of alignment and positioning devices for the roller platform positioning a container for engagement by the loadspreader to be coupled and lifted by the train.

Figure 66:
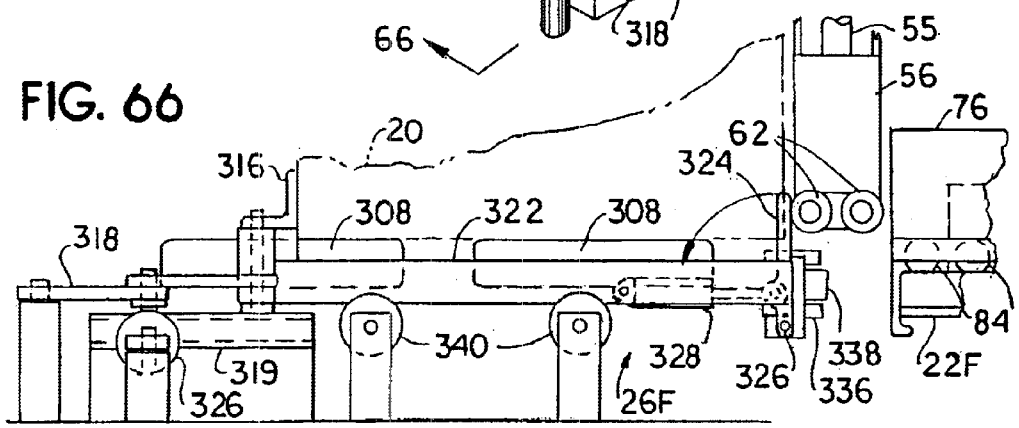
Figure 67:
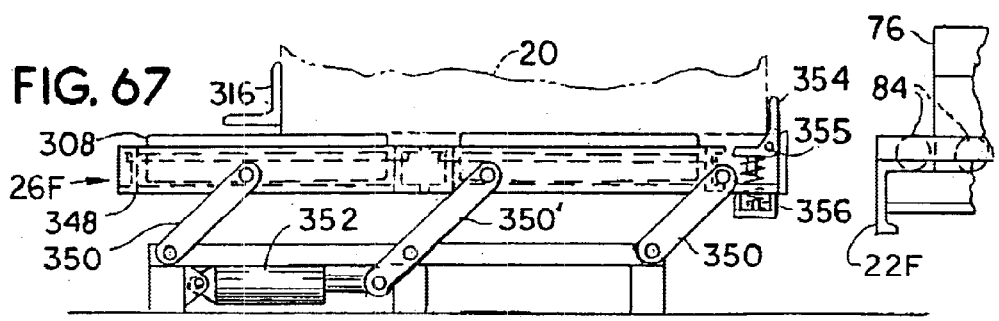

FIGS. 66 and 67 are aligned and elevations of respectively the positioning and roller beds holding a container in phantom in position before engaging the loadspreader with the car in direction of arrows 66 in FIG. 65.

FIG. 68 is a plan view of a variation of the car and loadspreader side coupling.

FIG. 69 is a side elevation of the loadspreader and car of FIG. 63 with hoist for clearing over a train.

FIGS. 70 and 71 are respectively left and right partial end views of the loadspreader aligned to engage the car of FIG. 68.

FIG. 72 is a side elevation of the loadspreader of FIG. 69 lifted to clear over the train.

FIG. 73 is a side elevation of a bilevel passenger car with loadspreader positioned to lift off a container section of the car.

FIGS. 74 and 75 are aligned plan and side elevations of a cargo container on a car engaging a loadspreader respectively before and after lifting, showing the movement of the car for this and showing the release of end latches of the container.

FIGS. 76 and 77 are side elevations of the side coupling latch and release on the car of FIGS. 74 and 75 to larger scale in respectively pinned and open positions as controlled by the loadspreader.

FIG. 78 is an end elevation of FIG. 77.

FIG. 79 is a partial end sectional elevation of the loadspreader engaging a container on the left before lifting to engage the one on the right.

FIGS. 80 and 81 are respectively partial plan and side elevation of a container of FIG. 79 showing a hook support-drop bar for dropping the hooks on the side of the container for pre-coupling the container before the loadspreader is lifted.

FIGS. 82, 83, and 84 are respectively plan and side elevations of a passenger car having a container (removable section) with end hoods opened by the loadspreader in FIG. 84 for end clearance during level transfer.

FIG. 85 is a plan view of the end of this container.

FIG. 86 is a perspective view of this container with near hood removed.

FIG. 87 is a perspective view of the hood.

FIG. 88 is a perspective view of an end of this car without the container in its berth.

FIGS. 89 and 90 are respectively plan and side elevation of a crane run along the track and a skewed traveling crane thereon having a crossover carriage accelerating to couple a car for transfer of containers.

FIG. 91 is a schematic plan of the crane run at a smaller scale extended to show cranes running for successive transfers with cars in the train.

FIG. 92 is a schematic of a successive starter for the cranes of FIG. 91.

FIG. 93 is a schematic side elevation of a pendulum starter set to push a container on a roller bed soon before being coupled by a loadspreader.

FIGS. 94, 95, and 96 are respectively plan, partial end, and side views of a crossover crane for automatic transfer of parts boxes to and from a tow truck being pulled by an under floor tow conveyor.

FIGS. 97 and 98 are perspective and end views of a variation of the hooks for the container to loader coupling.

FIGS. 99–100 are respectively partial side and end views of a variation of these hooks.

FIGS. 101 and 102 are respectively partial side and end views of another variation of these hooks.

FIG. 103 is an end sectional view of a recessable hook on a container.

Referring to the drawings and in particular to FIGS. 1–15, where crossover loader 18 is positioned to transfer a passenger container 20 from railway passenger car 22 (including a baggage, express or mail car) in a train moving from right to left on track 24 and insert a second container 20 in place of the one removed. Station platforms 26 are positioned where convenient for loading and unloading the containers on the loader.

The loader has one or more jib cranes, arm 28, mounted with an offset bracket 29 on pivot post 30 on top of a vertical column 32 to rotate horizontally in one or more arcs for transfer over track 24 or other vehicle way. The jib crane 28 carries a loadspreader 34 on parallel linkage frame 36 in an arc crossing the track centerline at about 35–45° to the track.

The jib crane 28 has a load shaft 38 secured depending vertically from its outer end. A sleeve 39 is supported to turn on shaft 38 and is secured central through the top frame 40 of parallelogram linkage 36 having its parallel links 44 supporting a bottom frame, loadspreader 34, to swing vertically parallel to track 24 to lift and lower to engage, release, and move or lift containers 20. Linkage 36 is a swing lift hoist. Links 44 at each end are preferably connected by cross braces 45, FIGS. 4 and 5. This parallelogram hoist 36 is held parallel to track 24 by means such as roller chain 46 connecting a sprocket 47 fixed on sleeve 39 and frame 40 to an equal sprocket 47' concentric on pivot post 30. Sprocket 47' is held in fixed position during transfer but turned to turn the loadspreader end for end if needed by means as an integral ring gear 48 secured depending fixed on sprocket 47' and driven by spur gear 49 on a worm gear motor 50 or could be fixed to the pivot post. The jib crane has an internal ring gear 51 secured depending from the bottom of the offset bracket 29 concentric with the pivot post. It is driven by spur gear 52 driven through an electric clutch 53 by reversible gearmotor 54 to rotate the jib arm 28. The clutch disconnects motor 54 to free the loader to be turned by the movement of the car.

The loadspreader has two vertical side lift coupling columns 55 depending central from each end to support a container on each side. Each column 55 has an alignment bracket of block 56, FIGS. 4–6, secured at right angles to the length of the loadspreader. A lift plate 58 is secured to and extends above each block 56 on each side to face a vehicle 22 for engaging a hook plate 60 extended from a side near each end at the top of container 20 to engage, support, lift, and release the container. Blocks 56 have wheels 61 to hold the container out at the bottom level when supported on the two plates 58 oil either side of the loadspreader. Blocks 56 extend down below container 20 when hooked on plates 58, FIGS. 12 and 13, and have rollers or wheels 62 to travel across the floor or guide track 64 in berth B while supporting the containers and guided on the end walls of the berth. Lift plates 58 have a shallow "V" notch spanning the top length at about 120° included angle to cradle hooks 60 on the container. The angle of the "V" notch is less than the angle of tangency to the swing position of links 44 where the coupling block leaves the berth so hook plates 58 can release from hooks 60 and let the loadspreader drop. The shorter that links 44 are the greater the angle of tangency for a given lift, but the greater the force needed to lift it to that height. Hooks 60 have a keyway or pocket 67 for plates 58 to engage in to secure the container on the loadspreader. Plates 58 can have side deflecting wings 68 to prevent catching on the side of the vehicle.

The container 20 has a bottom and sides securely connected and ends tapering outward from the bottom to form a keystone shaped container, FIG. 7, which fits into an upward lengthening opening, berth B, FIG. 9, which fits the container and can seal the ends of the container to the car body yet provides clearance when the container is lifted. The container has recessed end doors 70 and the car recessed doors 71 aligning to open the car to the container.

The loadspreader has a bracket 72 extending endward from each block 54 supporting a wheel 74 one on each side at a height of the hook plates 58 to rotate parallel the loadspreader and recessed in from the face of hook plates 58 so as not to engage the side of the container or car but engage a coupling plate 76 extended straight from the side of the approaching car 22 at the rear end of its berth to swing the loadspreader up on links 44 to engage hooks 60 on the car's container for transfer, lift the loadspreader to roll across the berth with its containers hooked on, and clear rollers 74 to cross the berth. Each plate is slanted parallel to its end of the berth, which helps the lift. Plate 76 can be overshot if the jib crane is not turned by the torque before roller wheel 74 reaches the top of the plate.

Referring to FIGS. 7–9, the container's hook plates 60 are each secured on top of a shaft or rod 78, FIG. 8, extending down inside the sides of the container and optionally through the floor. Rods 78 are mounted in sleeves to slide up and down and turn 90° out from the side of the container for engagement for transfer. These hooks can be interlocked with door locks or pins so plates 60 can only be turned out when the container is ready for transfer. The rods 78 on each side have linkage and levers 79 between them to be manually or otherwise turned to extend or retract the hooks. Rods 78 can extend down into pockets 80 open out to the sides of the car to hold the container from rolling or sliding off before hooks 60 are engaged and lifted and after disengagement by plates 58 dropping rods 78 into pockets 80 on the exiting side of the car. Hooks 60 have a shallow slope down to the end to slide a plate 58 up into pocket 67, FIG. 8, for plate 58 to key in to secure the container hooked, and release when blocks 56 swing down from a container left on the car. Hooks 60 when fully lifted support the container on brackets 81 on rods 78.

A slide coupling plate 76 is at each end of berth B parallel to the end of the berth mounted to shift transversely to be extended on the rear entry side of the berth. It is extended out to engage the coupling roller 74 on the rear block 56, i.e. the one facing the approaching car, to swing linkage 36 up into vertical alignment for hooking the container to the loadspreader on the entry side of the car. Only rods 78 on the lifted hooks are lifted. Rods 78 on the entering container are lifted only on the entering side while those on the far side remain down and engage in pockets 80 to hold the container from overshooting the berth and also stop the transverse movement of the loadspreader relative to the car momentarily until the linkage swings down, dropping plates 58 from hooks 60.

Rollers 62 hold the loadspreader at a height across the car to keep hooks 60 engaged and their rods 78 lifted above the floor and support but preferably only lift the containers on the car if there is interference and hold them and the loadspreader in alignment during transfer. Stops 82 on the hoist engage links 44 to limit the lift. A retarding cylinder 83 is connected between top frame 40 and one or more links 44 to limit the swing of the descending speed. Transverse rollerways 84 recessed across the floor of the berth can support the containers to roll out or in the berth during transfer. Rollers 84' in the ends of the berth also can guide the containers out and in.

Preferably the berth and container are extended endward in a step 85 at each end at the roof line. These endward extensions of the roof of the container better cover passageways between the container and car and open more room for rollers 74 to cross over the car between the outgoing and incoming containers, and cover a shelf at each end of the berth with catches 88 for securing the container on the car. A catch tab 88 extends down from each corner of the container's roof to straddle the sides of the car recessed therefore at the passageways 85. This can be a fixed tab if the container is lifted or preferably a latch bar, FIG. 10, pivoted at 89 to the side of the container and extending endward over bracket 81 on hook rod 78 to be lifted by hook 60 to clear over the car through this passage. This can be in addition to or replace rods 78 in pockets 80.

Referring to FIGS. 9 and 11, coupling plates 76 are mounted to slide across the car to extend from either side for transfer or be recessed in from the sides. A gear 96 engaging gear rack 97 along the side of each plate 76 is driven by motor 98 controlled to extend the coupling when right for transfer and retract it after transfer.

Figure 2:
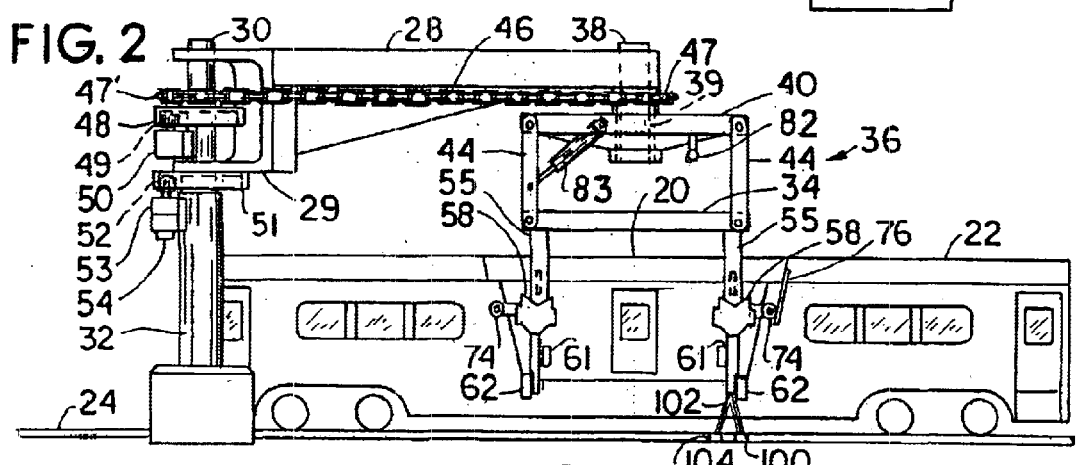
FIG. 2 is a side elevation of FIG. 1 with near container removed.
Figure 3:
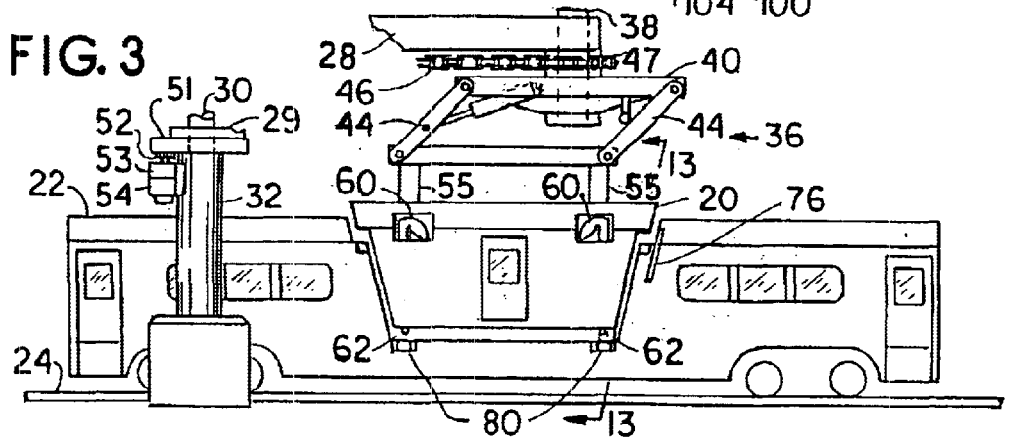
FIG. 3 is a side elevation aligned with FIG. 2 showing the train passing at a time during which both containers are lifted in the train.

A laser light 100 along side of track 24 directs a beam up to reflector 102 on the bottom of blocks 56 and back to receiver 104 to position the loader precisely by control of gearmotor 54, FIGS. 2 and 12.

Operation

Referring to FIGS. 1–3 and 12–15, coupler 76 extended on the near side of the car 22 approaching the loader from the right engages the right far side roller 74 on the loadspreader, FIG. 14. The coupling 76 moves the loadspreader forward and up on links 44, lifting the side plates 58 into aligned container lift hooks 60 to lift their rods 78 out of pockets 80 and lifts coupling blocks 56 to a height to enter wheels 62 into berth B to guide in end corners of the berth across the car. The force pulling linkage 36 provides a torque that will turn jib arm 28 counter-clockwise carrying the loadspreader across the car supported on wheels 62 at a height sufficient to keep plates 58 engaged with hooks 60 until coupling blocks 56 run off the far side of the car letting the loadspreader swing down setting the incoming container in its place. Links 44 lift the containers higher with increasing force if needed for clearance as in FIG. 3 because of the keystone design. Stop 82 limits the upward swing of the loadspreader as the train turns the jib arm to move one container out and one into the car. It works in reverse with the opposite coupling plate extended from the far side of the car to engage the vacant side of the loadspreader with the train moving left to right and sets the removed container back in as it removes a container from that car. It will similarly transfer a single container either to or from the car with the same movements.

Variations

Referring to FIGS. 16–19, where the loadspreader 34T has a wide frame supporting hooks 58T thereunder to engage in hook bails 60T to lift container 20T from the top. The same car 22 and berth B takes container 20T, and the loader is the same as 18 except for the loadspreader. Hooks 58T face oppositely on each side of the loadspreader 34T to hook container 20T coming from the direction to hook's face and release a container 20T on the opposite side of the loadspreader to that train.

Container 20T has two connected bails or hooking loops 60T at each end each in a different line of travel to engage on hooks 58T arranged to engage them in either direction the car is facing. Bails 60T are lifted by the lifting of the loadspreader on links 44, releasing the container for transfer. The bails at each end of the container are connected to a lift arch rod 78T extending across under the top of the container and down in each side into key pockets 80 on the car and engage the container to lift it after rods 78T are lifted by hooks 58T to a height to travel across the car.

Loadspreader 34T has two posts 55 depending from its frame with wheels 61 for engaging the side of each container to help steady it when needed. Posts 55 support blocks 56 and the same configuration of rollers 61, 62 and 74 to be engaged by car 22 similarly as described. The posts at each end are connected by crossbracing 125. Rollers 62 support the loadspreader to roll across floor 64 at a height to keep hooks 58T engaged in bails 60T.

Referring to FIGS. 19 and 20 where the loadspreader 34T for handling one container at a time is missing the left side and is supported on links 44 centered over the right side. The loader would remove the container, FIG. 19, moving to the left and would load it on a train moving in the opposite direction.

Referring to FIGS. 21–24, the jib arm 28 can support a bottom lift loadspreader 34B on a loader otherwise as described herein afore. The loadspreader 34B has a lift column 55B depending from each end of its frame on its centerline. Columns 55B are connected by a beam 138 between them at the bottom. At the bottom of each column and under beam 138 are pivotally supported two transfer arms 140 each pivotally supporting a platform 142 connecting the arms on one side of the loadspreader to swing as a parallelogram under container 20B and the same along the opposite side. A roller wheel 144 under each outer corner of each platform 142 rolls on the side of the car until it enters a berth opening 146 under the container with torque from motor 54. The sides of opening 146 are vertical and straight across car 22B to guide rollers 144 to guide the platform 142 under the container as arms 140 are rotated by movement of the train in passing from right to left moving the engaged platform from the position shown in FIG. 21 to that in 22 and 23 where stops 158 on beam 138 limit the rotation of arms 140 to stop when fully extended as shown in FIG. 22 and when retracted endward as in FIG. 21. Beam 138 extends endward beyond columns 55B to support wheels 62 to roll in line with rollers 144 on each end. These wheels all guide the loadspreader through the car. Rollers 144 on the bottom of platforms 142 are preferably held above the floor of the berth opening.

The arms 140 on the opposite side of the loadspreader turn oppositely from retracted position to extend to pick up a container and retract to leave a container on trains in opposite directions from opposite sides of the track.

Locating pins 170 on platforms 142 and on container supporting ledges in the berth engage in holes in the bottom of container 20 to locate and hold it on car 22B and loadspreader 34B. Additional pinning of the containers is recommended on the car after transfer thereto.

Figure 26:
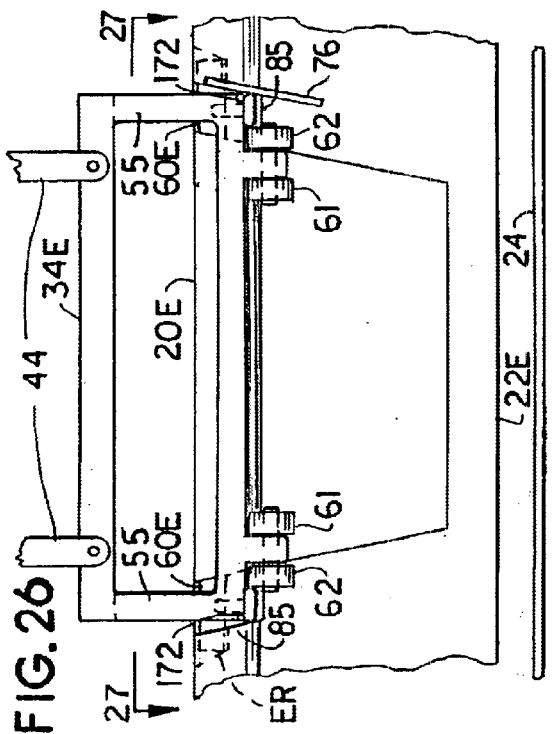
FIGS. 25, 26 and 27 are respectively end sectional, side, and plan views of an end lift loadspreader engaging a container with a car in the train.
Figure 27:
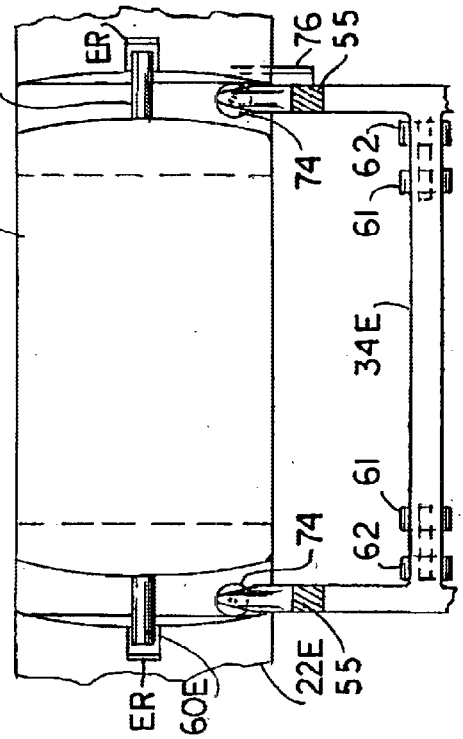
Figure 25:
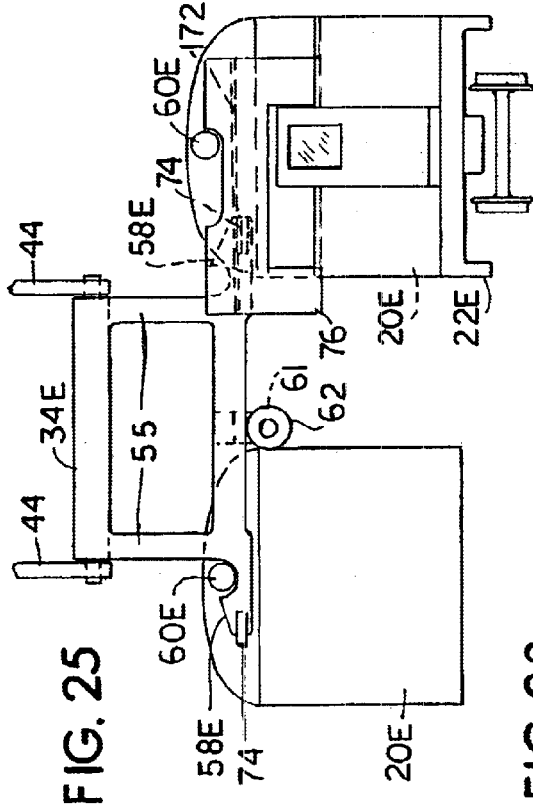

Referring to FIGS. 25–27, end lift loadspreader 34E for loader 18, otherwise as described, engages end trunions 60E at the top central on each end of container 20E for lifting. The loadspreader is supported on links 44 and has a transverse hook plate arm 58E on column 55 extending out from each side to extend under and engage a trunion 60E. Plates 58E straddle the ends of the container and have hook pockets they engage under the trunions to lift the container. Each plate arm 58E has an up tapered end with horizontal wheel 74 to roll across an open passage 85 in the ends of berth B. The hook pockets have a high back wall, column 55, to stop travel of the plate arm when aligned to lift the trunions. Wheels 61 and 62 are on a common central axis mounted on the bottom of arms 58E to engage the side of respectively the container and car to roll up thereon and into passage over the car with wheels 62 supporting the loadspreader guided on ends of the berth across the car.

The approaching car engages its extended trailing side coupling plate 76 with the rear facing roller 74 on the loadspreader. This moves the crane to cross over the car to where rollers 74 run under the trunions and end tapers on arms 58E press them down against the trunions until seated in pockets when wheels 62 engage the car to stop the crane. Continuing motion of the train lifts links 44, lifting the loadspreader and container until wheels 62 are lifted to clear through the coupling passages 85 in the roof of the car, starting the crane to continue across the car, lifting out a container if in the berth and inserting one it carried on by the loadspreader. Transverse flanges 172 on the inner faces of the berth extend in aways from the sides of the car to hold the loadspreader from lifting until the trunions arc engaged.

The outer ends of the trunions 58E can recess into recesses ER in the car roof to locate and secure the container in place when set down until otherwise secured as by longitudinal pinning from the ends of the berth.

Figure 28:
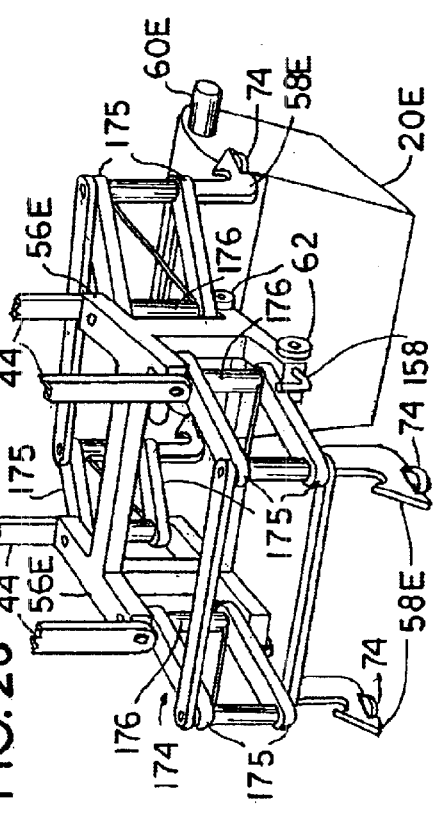
FIG. 28 is a perspective view of a variation of the loadspreader of FIGS. 25–27.

Referring to FIG. 28, the loadspreader of FIGS. 25–27 can be modified to more easily enter the coupling passage with less lateral movement by mounting the latch hooks 58E on the outer end of a horizontal parallelogram linkage 174 having parallel rotating arms 175 supporting a link connecting hooks 58E into a lift fork to swing out to carry plates 58E parallel under the trunions when the trailing roller is engaged by a side coupling plate 76. Blocks 56E support parallelogram linkages arms 175 on a pivot column 176 on one or both sides of the loadspreader for one or two containers respectively. Arms 175 are each a truss mounted to swing horizontally between a top and bottom extension of connected blocks 56E on links 44. Linkages 174 rotate easily to couple the trunions before appreciable lifting. Stops 158 hold the linkage from turning out beyond 90°. Wheels 62 mounted on the bottom of block 56E support the loadspreader to roll through the coupling passages. When hooks 58E are extended under the trunions, stops 158 hold the arms extended while the loadspreader is swung up on links 44 to lift the container that is on the car until wheels 62 roll up into the coupling passages 85 to hold the container lifted while the jib is turned by the car's movement to swing the container out the far side of the car. Linkages 174 turn out oppositely on opposite sides of the loadspreader to be pushed out from the car after a container is set down on the car. The arms 175 on an empty side of the loadspreader are extended before transfer and held extended by a dent on the supporting arms and are retracted after transfer by the train pushing them to turn parallel to the side of the loadspreader.

Figure 29:
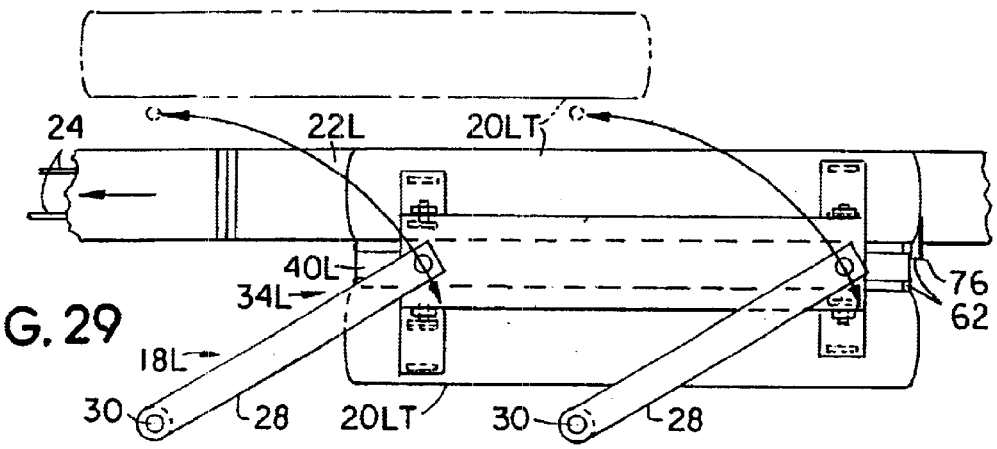
FIGS. 29 and 30 are plan and side elevations of a station having a double arm jib crane top lift loader engaging a container and car in a train moving right to left passing the station.
Figure 30:
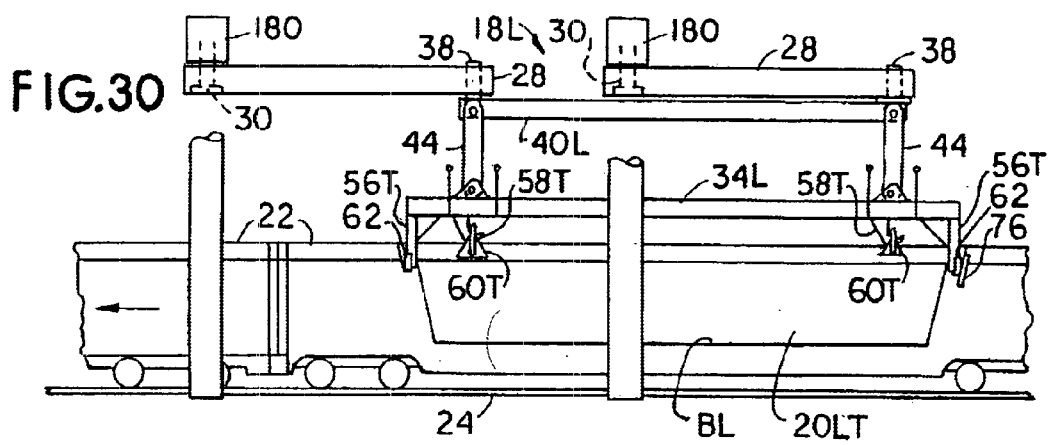
Figure 31:
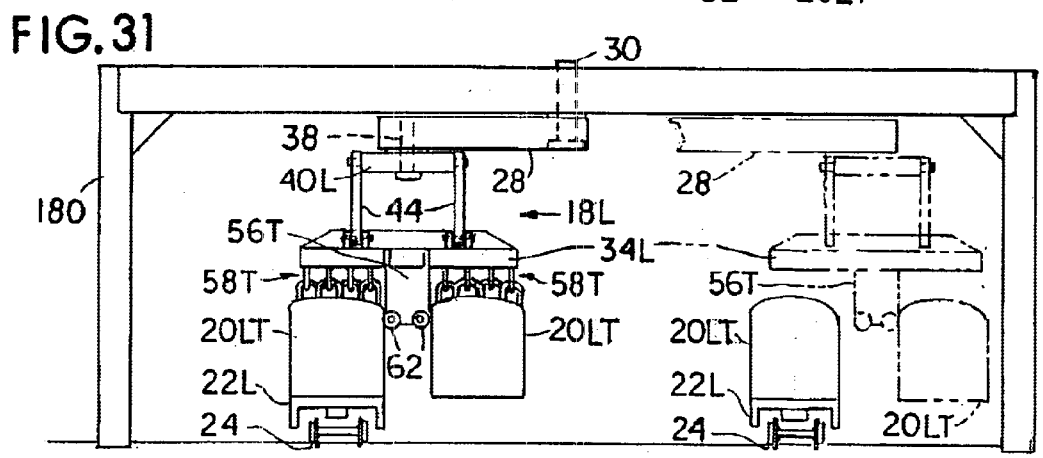
FIG. 31 is an end sectional elevation of FIG. 30 showing a gantry with jib crane for full circle operation over trains on two tracks.

Referring to FIGS. 29–31, loader 18L has two or more parallel rotating jib arms 28 of equal pivot length each supported on a pivot post 30. Each pivot post can be supported on a column 32 or suspended by other support such as gantry frame 180, FIG. 31, shown spanning two tracks 24 for full circle operation. A separate gantry 180 can support each pivot post 30, or the gantries can be connected and made a traveling gantry.

Two or more arms 28 are recommended for long containers up to car length. Each arm 28 has a depending pin 38 pivotally supporting a top frame or horizontal link 40L pivotally connected under them forming therewith a horizontal parallelogram linkage frame. Links 44 are suspended from horizontal link frame 40L to swing parallel thereto and to tracks 24, and support the loadspreader 34L for side by side transfer of containers 20LT. Though not shown here, chain 46 is run around sprockets 47 secured each to an arm 28 on pivot 38 to turn the arms together parallel through dead centers.

Loadspreader 34L selected for disclosure has top lift hooks 58T and includes additional features over the top lift loadspreader 34T which features are equally applicable to that loadspreader of FIGS. 16–19. Loadspreader 34L extends beyond the ends of the containers to hold a depending coupling post 55T at each end to travel across car 22L in passage 85 through the roof of the car at each end of the berth for container 20LT. End roof extensions on the container cover the passage. Side coupler plates 76, which can be extended from opposite ends of the berth BL to either side have the trailing one set out to engage the trailing roller wheel 62 on the side of the loadspreader facing the car for transfer as described.

Figure 32:
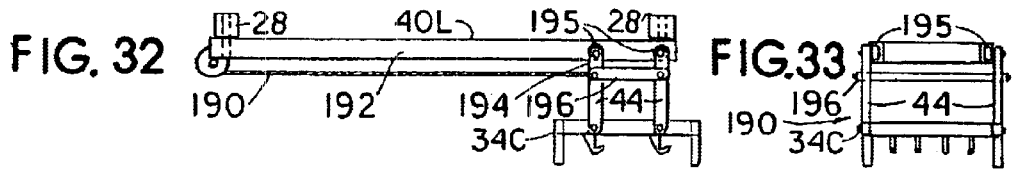
FIGS. 32 and 33 are side and end elevations of a loadspreader for the loader of FIGS. 29–31 having a catapult mounted for accelerating a container to near train speed before coupling.
Figure 33:
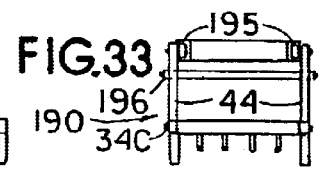

Referring to FIGS. 32 and 33, the long top frame 40L that connects arms 28 into a horizontal parallelogram in FIGS. 29–31 can support a catapult 190 with track 192 and short parallelogram lift car 194 to run on its track and be moved to approach at a little higher train speed before coupling to the car for transfer. Car 194 has links 44 supported on wheels 195 on beams 192 forming the top frame 40L. Links 44 are connected by a horizontal link 196 near the top and by the loadspreader 34C on the bottom. The loadspreader 34C is shown fitted for top lifting similar as in FIGS. 29–34 but shorter to accelerate a container like 20L (except short) along track 190 before being met by a car like 22LT except with a berth to fit the container.

The catapult could be and operate similarly as those shown in my U.S. Pat. No. 4,082,042, issued Apr. 4, 1978, FIGS. 1, 8–14, and 17–20, and be a traveling loadspreader 34C for holding the container to accelerate to car speed before transfer. Optionally the berth on a car could be near car length with a catapult in reverse to catch loadspreader 34C with container along side of and at the front of the car and decelerate them relative to the car as they reach the speed of the car at the rear.

Station Operation

Referring to FIG. 34, loader 18 having a loadspreader 34 which is rotated 180° or more by motor 50, FIG. 2, can turn the empty side to align for transfer at position A for a train from the left or position B for a train from the right to serve trains from either direction in any order.

If the loadspreader is not reversible, as with multiple jib arms, or if preferred to simplify the loader, FIG. 34 provides a station plan to serve trains in either direction in any order. It has a loader 18 mounted on pivot post 30 to rotate over track 24 in the first and second quadrants of the circle and retractable couplers 76 at ends of the car's berth.

Figure 1:
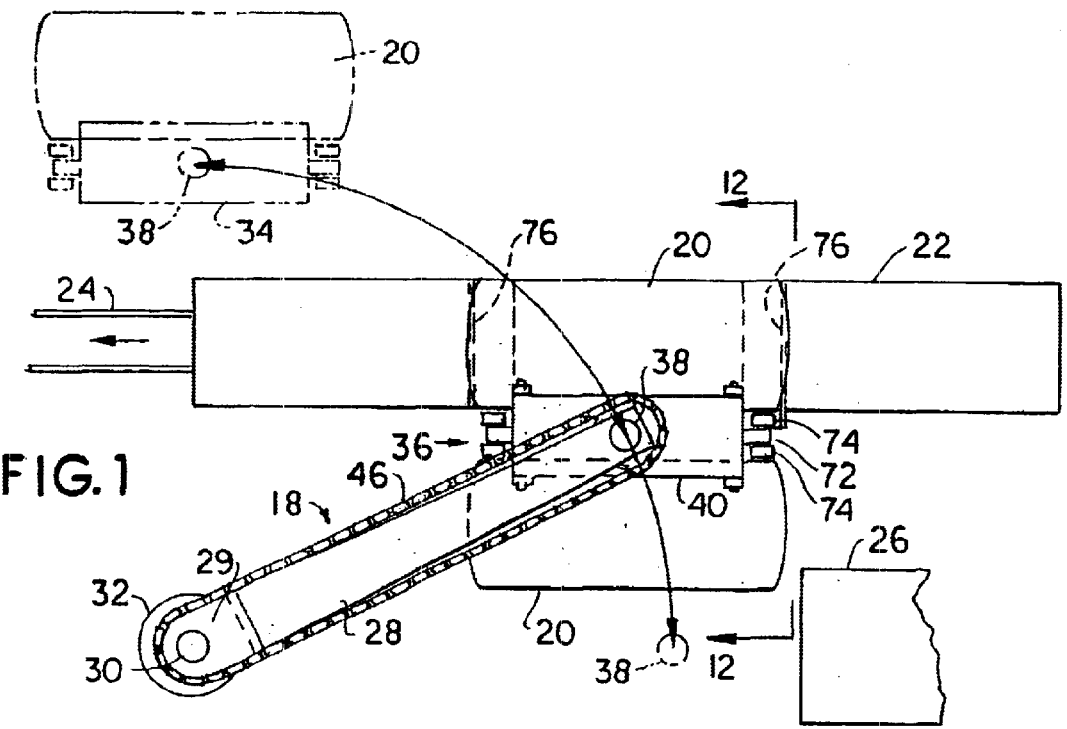
FIG. 1 is a plan view of a railway passenger, express, or mail station with a jib crane positioned to be engaged and turned by the train to take one container out and put another in its place on the train.

Starting with the loader at A as in FIG. 1, a first train from the right moves the loader from A to B and the next train if from the left moves it back to A. When successive trains are coming from the right every other one after the first has coupler 76 extended to the opposite side for use between C and D, and the loader is positioned at C to align for that train and is moved to D by the transfer. It waits at D for a train from the left or is moved to A for a train from the right. Likewise a second loader 18 can be added to work the second track 24S especially if all traffic is in one direction and opposite on each track. Positions E, F, G, and H for track 24S correspond to positions A, B, C and D for track 24 in the direction of the arrows.

Referring to FIG. 35, one or more loaders 18 are on a single pivot post 30 equally spaced from three crossing tracks T1, T2, and T3 to exchange containers with trains thereon. Three loaders 18 are shown but can represent three positions of the same loader. Each transfer is less than a 90° rotation across the track at a slope of about 45° at the crossing of track center by the load shaft 38 and in the direction of the train's travel. After each transfer the container removed from the train is moved to a station platform 26 to wait for the next train on any of the tracks from any direction and is moved into position for transfer. The parallelogram linkage is turned by motor 50, FIG. 1, to align the loadspreader parallel to the track and the jib arm positioned by motor 54, FIG. 1, for the transfer.

Station plan, FIG. 36 has a loader 18 positioned relative to track 24 to cross trains twice to transfer containers 20 from railway cars to a conveyor 200 and containers 20 from a conveyor 200 to reload cars as they are moved in the direction of the loaders' rotation.

Referring to FIGS. 37–41 for a bulk unloading hoist and station, where in FIG. 41 rotary loaders 18 are shown mounted on pivot post 30 to rotate thereabout in a circle crossing track 24 twice in transfer runs two car lengths apart. The containers are dump containers 20D as in my U.S. Pat. No. 6,354,782 B1, except their loadspreader has double ended hooks 58D and the container rods 60D are on and parallel over end doors 204 to lift the container and open the lower door when dumped while on the far side of the track from pivot post 30. Thus with train traveling left to right the containers are removed from cars 1, 2 and 3, dumped and returned to the same car as the train is moved or indexed moving the loaders. The loaders are otherwise moved by motor 54 between transfers with the train where the motor's clutch is disconnected for movement by the train.

The loadspreader for bulk dump container 20D has an upper frame 40H which in plan is an "H" frame supporting a lower "H" frame loadspreader 34H on parallel links 44 near each end and one on each side at the middle of the "H" frames to swing parallel to the car. A riser 206 across the center of frame 34H extends up to pivotally support an end of lift arms 208 to swing parallel between the sides of frame 34H and links 44. Two lift arms 208 are pivotally mounted on each side of riser 206 to swing up and down together to support a hook bail 209 to swing up and down between their outer ends parallel to the car to engage and disengage hooks 210 on the container. A cable or cylinder 212 is used to swing the bails to hook and unhook as in my mentioned U.S. Pat. No. 6,354,782 B1. Arms 208 are lifted by cables 214 connected near their outer ends and each run up to a cable drum and hoist on the outer end of frame 40H to lift or lower, tilt and dump the container with one arm raised and the other lowered as shown in FIG. 38 or in phantom in FIG. 40, where hooks 210 are on top of end doors to swing open to dump.

Frame 34H has depending end coupling guides 54 which travel on rollers 62 across the car in end passages 85. A roller 216 on each guide 54 is rubber covered to engage the ends of the container to align it for transfer onto the car. The container is set between end and side locating horns or sides and needs no pinning. This loader can remove, dump from either end and return the container 20D to the same car 22 while moving as described with FIG. 39.

Referring to FIGS. 42 and 43 wherein the loader of FIGS. 40–41 is adapted for lifting Standard ISO boxes using a typical loadspreader lift frame 220 mounted to swing on ends of links 222 in place of bails 209 and is otherwise as described with FIGS. 40–41. It can lift out or insert one or two stacked containers at a time on well car 22W while the car is moving.

The crane, FIGS. 44–46, is supported on wheels 248 which run on crane rails 240. Horizontal guide wheels 250 at each end of each side roll against the in sides of the crane runs to withstand turning forces. The hoist is rotated to turn the loadspreader and its load around end-for-end and hold it parallel track 24 with a solenoid release pin 252 connecting frame 40 to the crane carriage 246. Frame 40 can be turned by gearmotor 50 driving gear 48C with spur gear 49 when the pin is lifted. The crane is driven by reversible gearmotor 54 connected through electric clutch 53 to drive wheels 248 to move on its bridge rails 240 in either direction. Clutch 53 disconnects the drive to free the crane to roll to crossover the train when engaged therewith.

Skewed crane ways 240 are supported on columns 242 to span across the transfer area over track 24 at a diagonal of 33–55° skew angle. The car 22, containers 20, loadspreader 34 and hoist are as in FIGS. 1–15. The hoist linkage arms 44 are pivotally suspended from upper frame 40 having a central pivot 38C suspending it from a skewed crane carriage 246 spanning ways 240 parallel to track 24, so when the loadspreader is coupled to the car as described and lifted on links 44 to height to clear into berth B the force on the crane carriage 246 moves it across over car 22 to transfer one container 20 out and put one in its place on the car. The hooks 60 or container engagement can be of any type described.

The crane 246 is supported on wheels 248 which run on crane rails 240. Horizontal guide wheels 250 at each end of each side roll against the insides of the crane runs to take turning forces. The hoist is rotated to turn the loadspreader and its load around end-for-end and hold it parallel track 24 with a solenoid release pin 252 connecting frame 40 to the crane carriage 246. Frame 40 can be turned by gearmotor 50 driving gear 48C with spur gear 49 when the pin is lifted. The crane is driven by reversible gearmotor 54 connected through electric clutch 63 to drive wheels 248 to move on its bridge rails 240 in either direction. Clutch 53 disconnects the drive to free the crane to roll to cross over the train when engaged therewith.

Some Ways to Transfer Containers at Stations
Container Lift Transfers (Lift On and Lift Off)
1. Lower a lift platform to set container on the loadspreader and raise the platform to lift the container off, FIGS. 60–64.
2. Lift the loadspreader by cable winch or hydraulic cylinder on the hoist to lift off or set down container on a truck and drive out from under, FIGS. 56–58, or lift and lower using the truck and a latch to latch up the hoist when lifted by the truck.
3. Use a lift truck to set container on or lift from side of loadspreader, FIG. 59.

Container Transfer Substantially Level (Pull On and Push Off)
1. Place container on platform at same elevation as car bed and in position to be engaged by the loadspreader to lift only the container's hooks when the loadspreader is engaged by the train and lifted, FIGS. 62–67, or deepen key slots 67 in hooks 60 to engage without lifting.
2. Release latched up hooks 60 to drop enough extra to engage the loadspreader while the container is supported on a roller bed to move for level transfer with only the hooks lifted, FIGS. 79–81.

Station Adjuncts, Details, and Variations

Referring to FIGS. 47–49 for a cargo container transfer station that lifts containers 20F on and off the train in either direction, craneway 240 crosses over track 24 at 35° approximate minimum from straight across with a skewed carriage 246 thereon parallel to track 24 supporting a long hoist 36 on center pivot pinned or fixed. Hoist links 44 support a loadspreader 34F for containers 20F for truck to rail transfer.

The car 22F has a low elevated ledge bulkhead coupling way 85 transverse across each end of the berth as long as the container is wide and fixed open coupling plate 76 along the endward side of each ledge and extended to the car side on the right near side and on the left far side on top of the car's bed. The ledge is 6–12" high—enough for wheels 62 on blocks 56 to lift the loadspreader to engage and lift hooks 60 on the coupled side of the container and lift the container possibly two inches or minimum clearance across their berth before dropping the loadspreader to swing back down to lower the incoming container into its berth. Car 22F has a berth for holding a cargo container 20F of width for highway trucks—narrower than car 22F. Therefore wheels 62 clear over the car bed to be engaged and lifted by the right-hand coupling plate 76 to lift the loadspreader to roll across bulkhead ways 85. A roller 262 on a vertical axis on the bottom of each end of the loadspreader 34F engages the side of the car to align parallel before side coupling and guides longitudinally between bulkheads 85 during transfer.

This freight station has a platform 26F along each side of track 24 under the runway 240 of crane 246. Each platform 26F has rollers 272 on axes transverse to track 24 to support flat bottomed container 20F so it can be rolled along the dock and onto a truck that has a similar roller bed. A container can be rolled from the truck onto a platform 26F to a position where the loadspreader can be moved against it from track side and later when the loadspreader is engaged by coupling 76 to swing up aligned to engage hooks 60 and lift wheels 62 to ways 85 which supports the loadspreader to keep hooks 60 lifted across the car while transferring containers laterally on the car. When the loadspreader swings down from ways 85 with the removed container the incoming container is set down aligned in the berth. The removed container clears over the platform on the far side of the track until the loadspreader swings down unhooking the container to move along the conveyor. A push rail 276 of rollers is supported along the outer side on top of each platform and connected and moved by cylinders 278 to push the container and/or loadspreader against the train when ready to engage the car as will be described more fully with FIGS. 65–67.

FIGS. 50–53 show a simplified variation of the crane to support the loadspreader to run diagonally across while parallel to track 24. This crane has rails 240 supported on rollers 280 spring mounted on top of columns 242. Rails 240 have bottom channels 282 turned legs down to guide on wheels 280. Rails 240 are connected by cross-members 284 and diagonal stiffening cables 286. The loadspreader is supported on links 44 parallel to track 24 and pivotally connected to brackets 288 secured to the bottom of rails 240. Wheels 280 are each driven by gearmotor 54 through electric clutch 53 which disengages for the train to move the crane when the motor is not energized to position the crane.

Referring to FIGS. 54–61 for features of a more extensive station, where the craneways 240 are extended at each end beyond a single platform for various loading arrangements and can have a number of carriers on the craneway to enable successive transfers with the same train in passing in either direction. This station has craneways 240 supported on cross spans 296 on columns 242 spaced for the container to clear between so the crane runs can be extended.

Added features include direct loadspreader to truck transfer, FIGS. 56–58, where a truck trailer TT is driven on driveway D under the craneway and a crane carrier aligned against the side of the trailer. A cable secured to winch 298 is hooked to the loadspreader to swing it up to lift a container 20F from the trailer, which can then be driven away, or the trailer can be loaded by bringing a slightly lifted container over the trailer and lowering it. Loadspreaders so lifted are lowered and disconnected from the winch before transfer with the train.

The container can be transferred to and from the loadspreader with lift truck LT, FIG. 59. Truck LT has lift plates 58 replacing the usual forks. Plates 58 are adjustable to spacing of hooks 60 on the containers. This requires a wide driveway and turn area under the crane or at the end of its runway for turning containers 20F.

Referring to FIGS. 60–61 where a typical roller bed lift platform 26L is raised to lift the container off the loadspreader and be moved lengthwise on the conveyor. To load, the container is aligned lengthwise on the platform, lifted, the loadspreader moved against it, and the platform lowered aligned to engage hooks 60 onto plates 56 of the loadspreader.

Referring to FIGS. 62–67, it is preferred to provide same level, plane, or roll-on roll-off transfer, since the hooks 60 will then not need to support the load but only take push and pull forces. Accordingly, the platforms 26F along track 24 under the crane are normally at car bed level and have rollers 306 turned at the angle of the crane-way in frames 307 held at that level and alternate with rollers 308 transverse to track 24 in lift frames panels 310 which are recessed below but lift above rollers 306 to move containers parallel to track 24 to roll endward onto truck beds or conveyors, and to position for engagement with a loadspreader.

The preferred engagement between the loadspreader and containers on the dock is shown in FIGS. 62–64 where the loadspreader when engaged by the train is swung up where its lift plates 58 engage under hooks 60. These figures also show two half length containers 20H in place of one full length container by additional lift plates 58 so there are at least two for each container on each side of the loadspreader and interbox connectors 312.

Referring to FIGS. 65–67 for further details of container positioning means on the platforms, the container in phantom is resting on rollers in waiting position for approximate alignment of the car for transfer in a train from the right represented by its side coupling 76. The container was positioned lengthwise the platform by live rollers 308 when lifted and more accurately by cylinders 314. A side pusher angle bar 316 is supported above rollers 308 and moved sideways by toggle links 318 guided in tracks 319 and actuated by cylinder 320 to push the container sideways against the loadspreader. An extension arm 322 from bar 316 has an upstanding pusher plate 324 for moving the loadspreader sideways to engage the side coupling on the car. Pusher 324 is pivoted at 326 and forced upright by spring cylinder 328 pushing against stop bracket 336 on the end of arm 322 which also has a wheel 338 on vertical axle to roll against the side of the car when the loadspreader is pushed far enough to align for side coupling over the bed of the car. Arm 322 is supported on rollers 340 to move transversely to track 24 below the top of rollers 308 on the platform.

Since pusher plate 324 extends above the roller platforms to engage the loadspreader's coupling block 56 which is above the platforms, plate 324 is hinged at 326 to swing away from track 24 to let a container move onto the roller beds during transfer from a train. The pusher plate 324 is returned upright by spring cylinder 328 when the container is moved from over it.

The lift platform, FIG. 67, has a channel frame 348 supporting rows of rollers 308 on shafts at right angles to track 24. Frame 348 is supported on links 350 pivotally connected between it and a bottom support secured on the ground. Roller frame is lifted by one or more cylinders 352 connected between the support and a lever link 350'.

Referring to FIGS. 65 and 67, curb angle 354 is mounted along the track side edge of the lift platform one leg up and one in on end pivots 355 to swing in and let the container move onto the platform and then lift back up to stop the container from rolling off the side of the platform. It is supported on springs 356 to recess only counterclockwise in the Figures.

Platform 26F is lowered when the loadspreader is engaged by the train by exhausting cylinder 352 so the container rests on rollers 306 to roll at the transfer angle and curb 354 is below the top of rollers 306 so when hooks 60 are lifted and pulled by the loadspreader after being lifted by the train the container is pulled by its hooks to roll onto the car having bed of lengthwise rollers 84 for ease of transfer.

Referring to FIGS. 68–72 for a simplified variation of the car and loadspreader coupling which is generally applicable, wheels 62 on guard rails 358 on the loadspreader 34F support the loadspreader on its pass through the car. The bulkheads are as wide as the container and centered transversely on the car leaving space for a wheel 62 to engage a protruding coupler plate 76 on the rear end of the car. Latches 88F connected by tubing 360 at each end of the berth are mounted to be opened by wheels 62 lifting and holding them open while passing across the car.

As a separate variation, the hoist of FIGS. 68–72 has long links 44 and lift cable 366 connecting each end of the loadspreader with one or more turns around drum 368 connected by electric clutch 370 to gearmotor 372 to lift the loadspreader and preferably a container thereon to a height to cross above the train, so the crane can make more than one pass per train.

Referring to FIG. 73 where a bi-level passenger car 22BP has a container section 20BP with keystone tapered ends engaged for transfer by a loadspreader 34P, stairs 376 to each end of the lower level enable passage when the container berth is closed off for transfer.

Referring to FIGS. 74–78 for details of the securement of container 20F to car 22F and release when engaged by the loadspreader, car 22F has a latch arm assembly 88F at each end which straddles the end of the container to hold it and swings up to free it and open passage for the loadspreader and container when the latches at both ends are lifted by rollers 62 on the loadspreader. Each latch assembly has two parallel arms 382 spaced apart on a lift bar or pipe 360 and pivotally mounted on hinge pins 89 on the end sides of each bulkhead to swing up and away from the container. Pipe 360 extends out to the limit of car width on the bottom of arms 382 and over coupling channel 85 on both sides of the berth and rests in channel 85 at a height for wheels 62 to go under for coupling and lift and roll thereon lifted across the car. Wheels 62 lifted at both ends of the car lift latches 88F at both ends to free the container as hooks 60 are engaged with plates 58. Wheels 62 have a ball caster 385 central in their hub extending out to help it roll in any direction.

Referring to FIGS. 79–81 for an arrangement to lower hooks 60 to engage a loadspreader before it is lifted, hooks 60 drop to the position shown at the right in FIG. 79 normally, which will be engaging when the loadspreader is lifted by the train. Rather than wait for the loadspreader to lift, hooks 60 can be dropped further, as at the left in FIG. 79, to hook with the loadspreader by sliding a support bar 410 in either direction to let the coupling shafts 78 drop through slots 412 in bar 410. Bar 410 is a channel run legs down along the inward side of the container with a shaft welded in line to each end extending into a tube 418 and hole through each end of the container. Springs 422 center bar 410. Roller 424 supports the channel on which hooks 60 rest. A bar is inserted in the hole from either end of the container to push bar 410 so shafts drop through slots 412 on each side of where shafts 78 rest so the shafts drop through the slots when the loadspreader is aligned to hook. This is optional to swinging the loadspreader up into the hooks. The container should be on rollers to move freely.

Referring to FIGS. 82–88, the passenger car 22PL has a near full length container 20PL with tapered end hood 430 to lift separate from the container to open clearance gaps between the container and car during transfer. As seen in FIGS. 85 and 86 each end of the container has box channel track 432 secured vertically up each corner slightly recessed from the side on the container into which conveyor rollers 434 on the shield 430 roll up and down on the container. Hood 430 has only a roof and two tapered sides 436 at full car width and height to seal against tapered ends of the car's berth, FIG. 88. The hood has hooks 60 on each side fixed to a short rod 78 and mounted to swing into a roof pocket and be turned out for transfer. Rollers 434 are secured on axles through a "T" member 438 turned inward to roll up and down interlocked on tracks 432. The sides of the hood extend down to tapered insets below the floor of the car to help secure and seal to the car. The hoods provide clear passage between end doors in the container and end doors to the berth.

The loadspreader, FIG. 84, has side coupling columns 55 that pass over the tapered ends of the berth. Wheels 62 guide the containers across the car. Hook plates 58R and 58L have two nests for hooks 60, an upper one to engage to lift the hood and a lower one to engage the container after the hood is lifted to clear the car. Hooks 60 on the container are as in FIG. 8 and hook the container on the car pockets 80.

Preacceleration Before Coupling

Referring to FIGS. 89–92, one or more traveling cranes 444 run on a craneway track 240R supported on columns 242R along each side of track 24 for a transfer runway. The traveling bridge cranes 444 are skewed at about 30–50° and each has a carriage 246 that supports the hoist 36 and loadspreader 34 parallel to track 24 to cross over track 24 when coupled for transfer and powered by motor 54, FIG. 46, to return. Carriage 246 is driven by engagement of its loadspreader with a car in the train to cross over track 24 on its bridge crane. Traveling bridge cranes 444 are each driven by a motor 448 to be preaccelerated to couple with a particular car in the train. Successive bridge cranes 444 transfer with successive selected cars 22F in the train. An electrical contact running rail 450 is run along the craneway and segmented in carrier lengths 452 at each end. A similar rail 454 is run along track 24 and segmented correspondingly at each end in equal lengths 456.

Referring to FIG. 92, cranes 444 ready for transfer are lined up at the right end of craneway 240R for the next train. Each crane has its motor 448 connected between a contact shoe 458 and ground. The shoe 458 of the first crane contacts the running rail 450 and the rest contact their segments 452. Each car 22F has a series DC generator 460 (same as motor 448) connected across a contact shoe 462 in series with switch 463 to ground. The long contact rail 454 is connected to close a circuit when the first car from the right with switch 463 closed enters its shoe 462 on this rail through generator 460, contact rail 454 (about half the crane run), coil of relay 464A to ground, lifting relay 464A closing a circuit from rail 454 through its front contacts to craneway contact rail 450, shoe 458 to motor 448 to ground to start the first crane to accelerate to coupling speed before side coupling with that car. When the second car with a closed switch 463 connects the first segment rail 456 at the left in a circuit closed from its generator 460, shoe 462, that rail segment 456, front contacts of relay 464A to coil of relay 464B, it closes a circuit from the first contact rail 456 through front contacts of relay 464A to line 466, coil of relay 464B to ground and from line 466 through front contacts of relay 464B to first segment 452 from the left, shoe 458 and motor 448 of the second crane to accelerate it to couple the second car for transfer. Likewise the second segments 452 and 456 are connected when the next car with switch 463 closed enters the second segment 456.

Referring to FIG. 93 for an alternative way to preaccelerate a container before engagement with a loadspreader, a raised weighty parallelogram pendulum 470 is supported by lifting and latching up against the back of container 20 on a roller conveyor 26R is released to swing down to accelerate the container when the train reaches a point at a particular speed at which the container will be engaged by the loadspreader.

Application in Material Handling

Referring to FIGS. 94–96 for an application of the crossover transfer crane to material handling, a tow chain conveyor 480 is run under the floor to pull truck 22M with parts box 20M past crane carriage 246M which runs on three parallel box rails 240M diagonally across over conveyor 480 at about 45°. Crane carriage 246M has a top frame 40M supported by trolleys 248M to run on the rails 240M supported from the ceiling. A parallelogram linkage hoist 36 depends from carrier frame 40M supporting a loadspreader 34M having side plates 58 for engaging under hooks 60 on a side of parts box 20M. The loadspreader has a bump rail 488 extending along each side the length of the parts box and across each end at the bottom and a vertical roller 76M beyond each corner. One roller 76M at opposite corners is bracketed out to engage a roller 74M across each end of truck 22M. Those on the near right and far left are spaced sideways out to engage the forward roller 74M of truck 22M. Those on the near right and far left are spaced sideways out to engage the forward roller 74M of truck 22M. Those on the near left and far right are in line with the sides 488 but also extend endward equally for rollers 74M to key between.

With truck 22M being pulled to the left its front roller 74M engages the far left front rollers 76M on the loadspreader when aligned for lifting. Continued movement of the truck lifts the loadspreader on links 44 engaging plates 58 into hooks 60, lifting the parts box, and applies force to move the crane at the transfer angle about 45° with conveyor 480 when at a height to clear the bed of the truck, crossing over the truck to remove its container and replace it with another if one is engaged on the near side of the loadspreader. The loadspreader drops when the near roller 62 leaves roller 74M at the front of the truck, setting the leaving parts box down in place on the truck at a rate determined by the setting of the retarding cylinder 83. The loader will transfer in either direction of movement of the truck with the loadspreader positioned with an empty side facing the truck.

Returning to FIG. 86 stop pins 496 on the ends of the container through the top of tracks 432 limit the lift of the hoods so the container can be lifted by hooks 60 on the hoods or the container rolled on or off the car without lifting the container—only the hoods which latch the container to the car.

Referring to FIGS. 97–102, the side hooks 60 can be a continuous bar 60B for mounting along the top of the sides of the containers to be hooked onto bar 58B mounted along the side of the loadspreader to better distribute the load and secure hooking. The rolled section 60B has the key slot 67 and hook lip as does plate hook 60 but has locating ribs or pins 500, FIGS. 97–98, shallow "V" gussets 502, FIGS. 99–100, or rollers 504, FIGS. 101–102, spaced to correspond with the shallow "V" notches on plates 58B to hook thereon with lateral alignment. Bar plates 58B engage the top of slots 67 to support the container so rollers 504 are free of load. Gussets 506 can be added for strength along the top of bar hooks 60B.

Referring to FIG. 103 for another variation of the hooks 60, lift hooks 60S are secured on a pivot shaft 510 to swing out from flush with the side of a container 20 to be engaged by plates 58 or 58B as a type of hook suited for toys and models of this invention.

Having thus described some embodiments and applications of my invention I do not wish to be limited to those disclosed but intend to cover this invention by claims to be submitted to cover all variations, applications, and parts which are within the spirit and scope of this invention.

Hook 60S, FIG. 103, is mounted on shaft 510 to be turned out to hook or recess flush in container 20.

What is claimed is:

1. A system for transfer of containers to and from a moving vehicle having in combination: a vehicle way, a vehicle for traveling thereon, at least one container, a berth for said container on said vehicle, a swing lift parallelogram linkage hoist having depending parallel links of equal pivot length, a loadspreader suspended from the hoist and parallel to the swing of said hoist and the travel of said vehicle so as to be engaged and swing up-by movement of said vehicle, overhead oblique crossover means for carrying said hoist and loadspreader for moving said container along a substantially oblique line across and above said way with said container parallel to said way, alignment and coupling means extended between said vehicle and loadspreader when side by side on the side of said oblique line to which said vehicle first approached, said vehicle moving against said loadspreader parallel to the swing of the linkage to swing said loadspreader up to align and engage said container when on said berth, and at least one guiding path running across said vehicle and means on said loadspreader to support and guide said loadspreader lifted for travel across said path in line with said berth before clearing from said vehicle to swing down, said vehicle moving said overhead crossover means to travel across over said vehicle while said loadspreader is lifted in alignment for transfer of said container, and means for supporting said container when moved off of said vehicle.

2. In a system as in claim 1, said overhead oblique crossover means being a jib crane with pivoted arm mounted to swing obliquely over said vehicle way and support said hoist to travel said oblique line when turned by torque exerted by movement of said vehicle along said way against said loadspreader, and with a horizontal swivel supporting said hoist and means to turn said swivel so as to remain parallel while said crane is swung across and over said vehicle way.

3. In a system as in claim 2, further comprising a second vehicle way over which said hoist on said arm obliquely crosses, and means for rotating said hoist on said arm to align said loadspreader for parallel transfer with said second vehicle way.

4. In a system as in claim 1, said overhead oblique crossover means being a jib crane having at least two pivot posts spaced apart, each having a parallel rotating jib arm, a horizontal link pivotally connecting said arms into a horizontal parallelogram linkage, said hoist being suspended on said horizontal link to swing parallel to and cross over said vehicle way.

5. In a system as in claim 1, said overhead oblique crossover means being a skewed traveling crane and way crossing said vehicle way at an angle for said vehicle to pull said crane across and over said vehicle for container transfer.

6. A system as in claim 5 and a platform on each side of said vehicle way for supporting said container to move to and from the oblique line of transfer while parallel said vehicle way.

7. In a system as in claim 1, said overhead oblique crossover means being a skewed traveling bridge crane having a runway running parallel over said vehicle way, a bridge on said runway running obliquely skewed across said vehicle way and said runway, a carriage skewed parallel to said vehicle way to run across said bridge, and means for moving said bridge along said runway to meet said vehicle, said hoist being mounted on said carriage to align said loadspreader with said berth to engage, lift and be pulled along on said bridge to transfer said container as claimed.

8. In a system as in claim 1, said alignment and coupling means including wheels on said loadspreader positioned for supporting and guiding said loadspreader to roll aligned on said berth along said path straight across said vehicle with said loadspreader lifted on said berth, vertical coupling means including a roller on said loadspreader and a substantially vertical coupling plate extended from said vehicle to engage said roller and roll up to swing said loadspreader up to align and be supported on said wheels for travel across said berth when engaged by said vehicle moving in the direction approaching said loadspreader on the side of said oblique line to which said vehicle first approaches.

9. In a system as in claim 8, means for locking and releasing said container on said vehicle operated by said alignment and coupling means and said hoist.

10. In a system as in claim 1, said container having hook means to be engaged by said loadspreader when lifted to engage the container, said hook means being mounted to lift and lower on said container to keep from lifting the container normally, and platform means for supporting said container when moved off of said vehicle.

11. In a system as in claim 1, further comprising hooks on said container mounted for lifting relative to said container with said loadspreader moving them up, means for securing said container in said berth connected to said hooks to be actuated by said hooks and extending into said vehicle to release said container for transfer when said hooks are lifted.

12. In a system as in claim 1, said loadspreader having lift plates with "V" notches, said container having hooks for engaging in said "V" notches for said plates to align on to lift said hooks for transfer of said container.

13. For a system as in claim 1, said container having side hooks for lifting said container, a lift truck for side loading said container on and off of said loadspreader, said truck having wide "V" notched plates spaced apart to engage under said hooks extended from the side of the container to lift the container on and off the loadspreader.

14. A system as in claim 1, said way being a railway, said vehicle being a train thereon with a car in said train having said berth for said container, said berth and said container having fitting ends tapered up endward which open end gaps for clearance when the container is lifted.

15. A two-way simultaneous container transfer system having a vehicle way, a vehicle thereon, at least two containers, a crossover crane located and mounted to obliquely cross said way while engaged and pulled parallel by movement of said vehicle to cross over said vehicle, a parallelogram swing lift hoist mounted on said crane and having links of equal pivot length pivotally mounted and vertically depending therefrom to swing up parallel to and along side of said vehicle, a double sided side-by-side loadspreader on said hoist for engaging and transferring said containers on each side of said loadspreader, means for maintaining said loadspreader in parallel with said vehicle, means for engaging an empty side of said loadspreader parallel to said vehicle to be engaged by said vehicle to swing said loadspreader up to engage a said container on said vehicle and move it out the opposite side of the vehicle, and alignment and support means for holding said loadspreader lifted and guided while moving across and over said vehicle to move the containers out and in simultaneously by means of the vehicle's movement.

16. A system as in claim 15 and means for turning said loadspreader end-for-end to face an empty side of the loadspreader to a said container on the vehicle for transfer of the container from said vehicle.

17. A container transfer system comprising in combination: a track, a vehicle thereon, means for moving said vehicle along said track, a container for transport on said vehicle, a crane supported to travel obliquely across and above said track to be engaged and moved by said vehicle to move said container on and off of said vehicle, a hoist comprising an upper support frame on said crane and a lower loadspreader and a plurality of parallel links of equal pivot length pivotally connected and vertically depending from said upper frame to said loadspreader to swing in a vertical plane as a parallelogram linkage spaced parallel to said track, locating means for horizontally holding said container in place on said vehicle, means on said loadspreader for engaging said vehicle when moved along said track below said loadspreader in parallel alignment with said container and said loadspreader to engage and swing said loadspreader up with said parallel links to release said container from said locating means on said vehicle and hold said container horizontally, and means for holding said loadspreader lifted to release and hold said container horizontally while said vehicle is moved out from under said crane.

18. A container transfer system as in claim 17, said loadspreader and said container having support means for lifting said container to hold said container lifted on said vehicle by said loadspreader for transfer.

19. A container transfer system as in claim 17, and a platform along side of said track, said container being supported on said platform and on said vehicle while being transferred.

* * * * *